US010748159B1

(12) United States Patent
Selinger et al.

(10) Patent No.: US 10,748,159 B1
(45) Date of Patent: Aug. 18, 2020

(54) CONTEXTUAL ANALYSIS AND CONTROL OF CONTENT ITEM SELECTION

(75) Inventors: David Lee Selinger, Castro Valley, CA (US); Darren Erik Vengroff, Seattle, WA (US); Tyler David Kohn, San Francisco, CA (US); Randall Stuart Fish, Castro Valley, CA (US); Michael James DeCourcey, Belmont, CA (US)

(73) Assignee: RichRelevance, Inc., San Francisco, CA (US)

( * ) Notice: Subject to any disclaimer, the term of this patent is extended or adjusted under 35 U.S.C. 154(b) by 2445 days.

(21) Appl. No.: 13/179,365

(22) Filed: Jul. 8, 2011

Related U.S. Application Data

(60) Provisional application No. 61/362,645, filed on Jul. 8, 2010.

(51) Int. Cl.
*G06F 7/00* (2006.01)
*G06Q 30/02* (2012.01)

(52) U.S. Cl.
CPC .................................... *G06Q 30/02* (2013.01)

(58) Field of Classification Search
CPC ..................................................... G06Q 30/02
USPC .......................................................... 705/14
See application file for complete search history.

(56) References Cited

U.S. PATENT DOCUMENTS

| 6,601,075 | B1 | 7/2003 | Huang et al. ............. 707/104.1 |
| 6,963,867 | B2 | 11/2005 | Ford et al. ...................... 707/3 |
| 8,131,767 | B2 * | 3/2012 | Brindley ....................... 707/791 |
| 2005/0289018 | A1 | 12/2005 | Sullivan et al. ................ 705/27 |
| 2008/0109285 | A1 | 5/2008 | Reuther et al. .................. 705/7 |
| 2008/0215416 | A1 | 9/2008 | Ismalon ......................... 705/10 |
| 2008/0288348 | A1 | 11/2008 | Zeng et al. ..................... 705/14 |
| 2008/0306819 | A1 | 12/2008 | Berkhin et al. ................ 705/14 |
| 2009/0006216 | A1 | 1/2009 | Blumenthal et al. .......... 705/26 |

(Continued)

OTHER PUBLICATIONS

"Find a $50 Version of Those $500 Shoes with Modista," retrieved on Feb. 27, 2009, from http://mashable.com/2008/12/11/modista/, 12 pages.

(Continued)

*Primary Examiner* — Abhishek Vyas
*Assistant Examiner* — Darnell A Pouncil
(74) *Attorney, Agent, or Firm* — VLP Law Group LLP; James A. D. White

(57) ABSTRACT

Techniques are described related to selecting content items, such as by enabling user analysis and control of product-related content items selected for display to users. The content items may include advertisements or other promotional materials, and the selecting of the content items may be performed as part of determining particular promotional materials to display or otherwise present to particular users in particular situations. User analysis and control of selected content items that are displayed on a target electronic site may be enabled by providing, as part of the target electronic site, additional selection-related functionality whose availability is restricted to one or more authorized users—for example, such additional restricted access information and user-selectable controls may be provided on a version of a Web page of an online retailer to enable the retailer to analyze and influence future content items selected for display on the online retailer's Web page(s).

37 Claims, 14 Drawing Sheets

(56) References Cited

U.S. PATENT DOCUMENTS

2009/0089141 A1\* 4/2009 Lara et al. ..................... 705/10

OTHER PUBLICATIONS

"Modista: browse for shoes and handbags by visual similarity," retrieved on Feb. 27, 2009, from http://www.modista.com/, 1 page.
"Modista: Jessica Bennett Fame," retrieved on Feb. 27, 2009, from http://www.modista.com/, 1 page.
"Modista: Women's Shoes," retrieved on Feb. 27, 2009, from http://www.modista.com/, 1 page.
"Online Shopping for Shoes and Handbags," retrieved on Feb. 27, 2009, from http://www.ssasychic.com/fashion/modista-a-new-way-to-shop/, 5 pages.
"Superfish—Search by Sight," retrieved on Feb. 27, 2009, from http://www.superfish.com/, 1 page.
"JewelryViewer," retrieved on Feb. 27, 2009, from http://www.jewelryviewer.com/, 1 page.
"Want a Better Way to Search Amazon and eBay? Try PicClick," retrieved on Feb. 27, 2009, from http://mashable.com/2008/11/25/picclick/, 22 pages.

\* cited by examiner

Example Item-Specific Web Page from Retailer RRR

⌐ 200b

Description of Product Item ABC
of Brand LLL from Manufacturer SSS — 205

User-Selectable Item Ordering Controls — 210

Customers Who Bought This Item Also Bought The Following — 230b

215b:
- Item BCD of Brand MMM — 216a
- Item CDE of Brand NNN — 217a
- Item DEF of Brand LLL — 218a
- Item EFG of Brand NNN {CIS logo} — 219b Top Selling Items In This Category — 220a / 230a 225b:
- Item CDE of Brand NNN — 226a
- Item ABC of Brand LLL — 227a
- Item FGH of Brand OOO — 228a
- {CIS info} — 229b

*Fig. 2B*

Example Restricted Access Functionality from CIS Service

200e

Filter Recommendations For Retailer RRR by:

275a {
    285a — For recommendations made for:

280a {
- ☑ product/service item ABC
- ☐ product/service items from Brand LLL
- ☐ product/service items from Manufacturer SSS
- ☐ product/service items of category FFF
- ☐ current recommendation display location Apply filters by specifying the following:

280b {
- ☐ filter by specific product/service items
- ☐ filter by price
- ☐ filter by brand 285b —
- ☑ filter by product/service item category
- ☐ accessorize from other item categories
}

275b — Sales Reports

275c — Content Item Selection Drilldown

275d — My Account

*Fig. 2E* top | Geographic Top Sellers | Movers and Shakers | Recent Activity | Search | Advertising
Jump to product: [          ] GO Retailer RRR

Fig. 4A

Charger Set XYZ for Apple iPhone/iPod
Recommendable: true

/ 400a

http://<RetailerRRR>.com/images/products/XYZ.jpg

| | |
|---|---|
| External Id | 4125958 |
| Genre | Electronics |
| Price Cents | 499 |
| Sale Price Cents | 0 |
| Brand | Generic |
| Description | 3C6C693E43686172676520796F7572204170706C652069506F642F6950686F6E6520616E7977686572652079 6F75206F76F3C2F6C693E3C6C693E4C69676874776 |
| Location Name | null |
| Location URL | null |
| Num Reviews | -1 |
| Rating | 4.550000190734863 |
| Link URL Pattern | $CLICK_THRU_SERVER$/$ITEM_EXTERNAL_ID$/product.html?$CLICK_THRU_PARAM_0$ |
| Link Id | null |
| Product Link | http://www.overstock.com/4125958/product.html? (opens in a new window) |
| Add To Cart Link | http://www.overstock.com/cart?addpro=4125958 (opens in a new window) |

Attributes:

410a

| key | values | escaped value |
|---|---|---|
| Condition | [(New)] | [(New)] |
| PRICE_STORY | [Today: $4.99 Compare At: $7.90 You Save: $2.91 (37%)] | [<span class="price">Today: <strong>$4.99</strong></span><span class="compare">Compare at: <em>$7.90</em></span><span class="you-save">You Save: <em>$2.91 (37%) </em></span>] |
| Eco-Friendly | [(None)] | [(None)] |
| Country | [(None)] | [(None)] |
| Wounded Warrior Project | [(None)] | [(None)] |
| Compatibility | [(Ipod Classic),(Ipod Mini),(Ipod Nano),(Ipod Touch),(Ipod Video),(Apple Iphone)] | [(Ipod Classic),(Ipod Mini),(Ipod Nano),(Ipod Touch),(Ipod Video),(Apple Iphone)] |
| Earth Friendly | [(None)] | [(None)] |

Categories
- Electronics | Audio & Video | MP3 & iPod Accessories | Adapters & Chargers

Merchandising Rules

| In Blacklist | false |
|---|---|
| In Silo | false |

No regional pricing for this site

Go to multi item strategies

Fig. 4B

| Purchase CP | Click CP | Viewed/Purchased | Viewed/Purchase Percent | XCP | Purchase EV | Click EV |
|---|---|---|---|---|---|---|
| Family Purchase CP | Accessorizer | Same Artist | | | | |

Purchase CP for Charger Set XYZ for Apple iPhone/ iPod

| | ExternalId | Name | Brand | Score | Recommendable | Details | GenreTopSeller? | |
|---|---|---|---|---|---|---|---|---|
| 1 | 4155506 | ipod iTouch Leather Case And Protective Kit | Generic | 0.18219037871033777 | true | details | true | 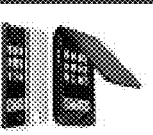 |
| 2 | 3889200 | Textured Silicone Skin Case for Apple iPhone | None | 0.09723643807574207 | true | details | true | 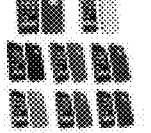 |
| 3 | 4230160 | All-channel FM Transmitter with iPod/ iPhone Car Charger | Generic | 0.09689525759126578 | true | details | true |  |
| 4 | 1924976 | Car Audio Cassette Adapter for Apple iPod/ MP3 | Generic | 0.08154213578983283 | false | details | false |  |
| 5 | 3100172 | iPhone 3G Mirror Screen Protectors (Pack of 2) | None | 0.06687137495735244 | true | details | true |  |
| 6 | 3343728 | Screen Protectors for Apple iPhone 1st Gen (3Pack) | None | 0.06277720914363698 | true | details | true | 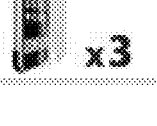 |

| 7 | 3496797 | LUX Apple iPod Touch 2G/3G Silicone Skin Case | None | 0.04605936540429888 | true | details | true |  |
|---|---|---|---|---|---|---|---|---|
| 8 | 2980069 | Wallet Leather Case for Apple iPhone | None | 0.04435346298191743 | true | details | true | 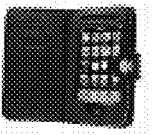 |
| 9 | 3275019 | Stylus Pen for all Apple iPhone/ iTouch Models | UNIVERSAL | 0.037188672807915386 | true | details | true | 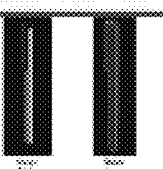 |
| 10 | 4324373 | Circles Design TPU Crystal Skin Case for Apple iPod Touch | Generic | 0.0368474923234391 | true | details | true | 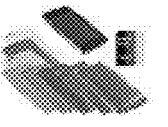 |
| 11 | 4291052 | Anti-fingerprint Anti-glare iPhone 3G/ 3GS Clear Screen Protector | UNIVERSAL | 0.0368474923234391 | true | details | true | 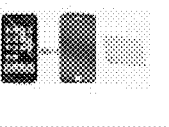 |
| 12 | 2117787 | AC to DC Car Charger Socket Adapter | None | 0.03138860457181849 | true | details | true |  |
| 13 | 4569726 | Eforcity Durable Black Sport Armband for Apple iPod Touch | Generic | 0.031047424087342203 | true | details | true |  |
| 14 | 4389817 | Apple iPod Touch 8GB 3rd Generation- Latest Model (Refurbished) | Apple | 0.03036506311838963 | true | details | true | 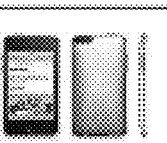 |
| 15 | 4399715 | Screen Protector X2 for Apple iPod Touch 2nd and 3rd Gen | MEElectronics | 0.02968270214943705 | true | details | true | 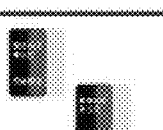 |

| 16 | 4305286 | Apple 3.5mm Stereo Headset | Apple | 0.026953258273626747 | true | details | true |  |
| 17 | 3171150 | Retractable 3.5mm White Audio Extension Cable | None | 0.026270897304674173 | false | details | false | 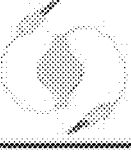 |
| 18 | 3298197 | Apple iPhone 3G Silicone Case with Screen Protector | Generic | 0.023882633913340157 | true | details | true | 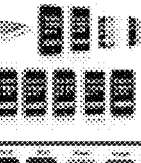 |
| 19 | 3644363 | Touch 2 Rubberized Hard Case with Screen Protector | None | 0.02354145342886387 | true | details | false | 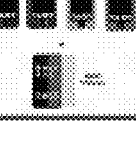 |
| 20 | 4567049 | Eforcity White AC Wall Travel Charger for Apple iPod / iPhone 3G | Generic | 0.022517911975435005 | true | details | true |  |
| 21 | 4230159 | iPod/ MP3 Universal Car Audio Cassette Adapter | Generic | 0.022517911975435005 | false | details | false | 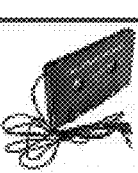 |
| 22 | 4140168 | Zeikos High Speed SD SDHC Digital Card Reader | Other | 0.001364721937905152 | false | details | false | 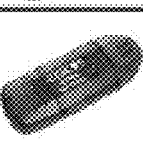 |
| 23 | 3168371 | Apple iPod 4-way Travel Supercharger iPod Charger | Apple | 6.82360968952576E-4 | true | details | false |  |
| 24 | 4127112 | Skullcandy Lowrider Headphones | Skullcandy | 6.82360968952576E-4 | false | details | false | 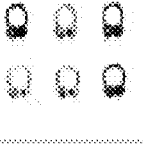 |

*Fig. 4D*

| 25 | 3457594 | iFrogz Clear/ Black Luxe 3G Apple iPhone Case | Apple | 3.41180484476288E-4 | false | details | false |  |
| 26 | 3513289 | Hard Drive Case for Western Digital Passport | None | 3.41180484476288E-4 | true | details | false |  |
| 27 | 2147499 | Wireless LAN 802.11g 54Mbps/ 2.4GHz USB Adapter | None | 3.41180484476288E-4 | true | details | false |  |
| 28 | 3968039 | Polaroid TDX-01530B 15 inch HDTV/ DVD Combo (Refurbished) | Polaroid | 3.41180484476288E-4 | true | details | false |  |

Num recommendable: 22 out of 28

415e

400e

CONTEXTUAL ANALYSIS AND CONTROL OF CONTENT ITEM SELECTION

CROSS-REFERENCE TO RELATED APPLICATIONS

This application claims the benefit of U.S. Provisional Patent Application No. 61/362,645, filed Jul. 8, 2010 and entitled "Analysis And Control Of Content Item Selection," which is hereby incorporated by reference in its entirety.

TECHNICAL FIELD

The following disclosure relates generally to content item selection, such as by enabling user analysis and control of product-related content items that are selected for display to users in particular situations.

BACKGROUND

In addition to providing access to information, the World Wide Web (also referred to as the "Web") has increasingly become a medium that is used to search for, shop for and order items (such as products, services and/or information) that are available for purchase, rent, lease, license, trade, evaluation, sampling, subscription to, etc. In many circumstances, a user may visit the Web site of a Web merchant or other online retailer that provides one or more items (sometimes referred to as a "Web store"), such as to view information about the items, give an instruction to place an order for one or more items, and provide information needed to complete the purchase (e.g., payment and shipping information). After receiving an order for one or more items, the online retailer then fulfills the order by providing the ordered items to the indicated recipient, such as by delivering product items electronically (e.g., music downloaded over the Internet) and/or through physical distribution channels (e.g., shipment via a governmental postal service or private common carrier, such as for paperback books). Similarly, some service items may be provided electronically (e.g., providing email service), while others may be provided physically (e.g., performing cleaning services at the purchaser's house).

While access to information about items via the Web provides many benefits, various problems also exist. As one example, given the large numbers of items that may be available from various online retailers, it can be difficult for a consumer user to identify particular items that may be of interest. In addition, it can be difficult for item providers to provide information about particular products to consumer users in appropriate situations.

BRIEF DESCRIPTION OF THE DRAWINGS

FIGS. 2A-2E illustrate examples of enabling user analysis and control of content item selection in particular situations.

FIGS. 4A-4E illustrate examples of information that may be provided to a user to enable analysis and control by the user of content item selection in particular situations.

DETAILED DESCRIPTION

Figure 1:
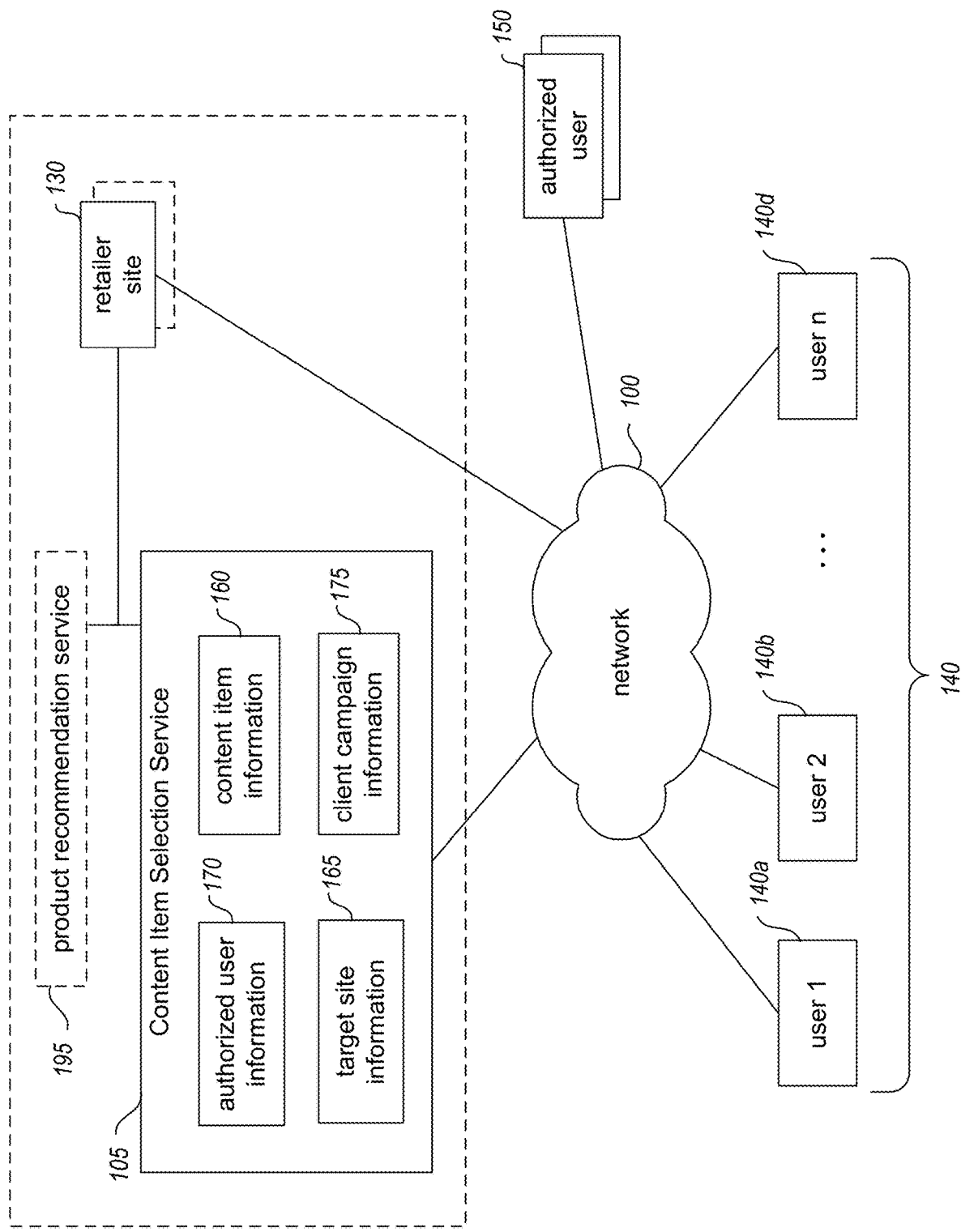
FIG. 1 is a network diagram illustrating an embodiment of a content item selection service for dynamically selecting content items to use in particular situations and for enabling user analysis and control of the content item selection.

Techniques are described related to selecting content items to be used in various manners, such as in at least some embodiments by enabling user analysis and control of product-related content items that are selected for display to users in particular situations. In some embodiments, the content items include advertisements or other promotional materials, and the selecting of the content items is performed as part of determining particular promotional materials to display or otherwise present to particular users in particular situations, such as in an automated manner by a computer-implemented Content Item Selection ("CIS") service. The presentation of the selected content items may occur in various manners, including in some embodiments via Web sites or other electronic sites (e.g., as part of Web pages or other content served from those sites) of one or more online retailers or other online entities that are distinct from the CIS service and its provider. In addition, the enabling of the user analysis and control of selected content items that are displayed on a target electronic site may in some embodiments include providing as part of the target electronic site additional selection-related functionality whose availability is restricted to one or more authorized users—for example, if the selected content items are displayed on a Web page of a target Web site of an online retailer, additional restricted access information and user-selectable controls related to the content item selection may be provided on a version of that Web page to the online retailer, such as to enable the retailer to analyze and influence the content items that are selected by the CIS service for display on the Web page. By enabling a user to access information and controls from particular locations of an online retailer's Web site or other target electronic site, the user may, for example, be enabled to more efficiently access and control desired information, as is discussed in greater detail below. Additional details related to particular content item selection techniques and related user analysis and control techniques are included below.

The content items to be selected may be of various types in various embodiments. As previously noted, the content items include advertisements or other promotional materials in at least some embodiments, such as for particular items, brands and/or related companies (e.g., item manufacturers, distributors, wholesalers, etc.), and may in some such embodiments be supplied by or otherwise indicated by particular clients (e.g., by one or more of the related companies for particular product items and/or service items that the companies provide or otherwise promote). In addition, such content items may have various forms, such as for a particular content item to include one or more of text, one or more images, one or more videos, one or more audio clips, one or more user-selectable controls, one or more associated operations to be performed in response to particular actions by users to whom the content item is presented (e.g., by the user clicking on or otherwise selecting the content item), etc. The selecting of particular content items by the CIS service may also in some embodiments be performed in accordance with campaigns of particular companies or other entities that are clients of the CIS service, such as based on fees paid by those companies to promote visibility of particular promotional materials in accordance with particular campaign criteria specified by the companies, as discussed in greater detail below. Thus, content items may in some embodiments include promotional materials or other types of information that are selected by the CIS service and displayed to users in particular situations, including with other information from one or more other third-party target sites (e.g., as part of Web pages provided by those other target sites).

The target sites on which content items and restricted access functionality may be provided may have various forms in various embodiments. For example, target sites used in a particular embodiment may include one or more of the following non-exclusive list: online retailer Web sites (e.g., which may each provide numerous Web pages that are each specific to one or more particular items, such as to enable consumer users to purchase those items from the site); other non-retailer Web sites that include information about particular items (e.g., review or opinion sites, encyclopedia or other general knowledge sites, search engines that include item information in search results, etc.); other Web sites that include information that is not specific to particular items (e.g., general news sites); and other electronic sites that are accessible in manners other than via the Internet (e.g., an application store or other electronic marketplace that is provided by a cellular telephone network provider and is accessible by devices connected to the cellular network; an electronic store or other marketplace that is provided to users of a specialized type of computing device, such as game consoles connected to a manufacturer-provided electronic store; etc.). In addition, the target sites may have various types of contractual relationships or other affiliations with the CIS service, including arrangements in which the target sites are paid by the CIS service for allowing selected content items to be presented on their sites and/or in which the CIS service is paid by the target sites for selecting and providing content items to be presented on their sites. For example, in embodiments in which at least some of the content items include promotional materials, the CIS service may operate as part of a service that provides advertisements for display on one or more target sites (e.g., on item-related pages provided by an online retailer target site), or the CIS may otherwise be affiliated with one or more such advertisement-providing services—in addition, in at least some such embodiments, the content item selection techniques of the CIS service may operate in conjunction with other techniques for selecting advertisements for display (e.g., pay-per-click or pay-per-view systems, such as based on bids supplied by advertisers), such as to supplement, adjust and/or replace the other advertisement selection techniques, as discussed in greater detail below.

The described techniques enable functionality related to content item selection to be provided to users via target electronic sites in various manners in various embodiments. In particular, as previously noted, user analysis and control of selected content items that are displayed on a target electronic site may be enabled by providing additional restricted access functionality related to the content item selection that is available to one or more authorized users, such as at least in part from portions of the target electronic site. For example, if the selected content items include one or more content items that are part of a first client's campaign and that are displayed on a first Web page of a target Web site of a second online retailer, the one or more authorized users may include a user representative of the second online retailer and/or a user representative of the first client. In addition, the identity of an authorized user may be determined in various manners. For example, when the first Web page is initially displayed to a user on a computing device of the user, the first Web page may not include any visual representations of any of the restricted access information and/or user-selectable controls, but may include a link or other user-selectable control to enable the user to identify himself/herself as an authorized user (e.g., to enable the user to provide login information, such as a username and password, or other identifying information that is associated with the authorized user)—if so, after the user provides information to establish that he/she is an authorized user, the visual representation of the first Web page that is displayed to the authorized user may be updated to include at least some of the restricted access functionality (e.g., by downloading a new version of the first Web page that includes restricted access information and/or controls to the user's computing device and displaying the new version of the first Web page; by altering the visual representation of the first Web page within a Web browser on the user's computing device without downloading a new version; etc.). Alternatively, in other embodiments, an identity of an authorized user may be determined in other manners (e.g., based on the user supplying a credential or other identity-related information before accessing the first Web page; based on the computing device that is being used by the user; etc.), and in some embodiments the version of the first Web page that is initially provided and displayed to the authorized user may include visual representations of restricted access information and/or controls.

The identification of authorized users and the corresponding providing of restricted access information and/or user-selectable controls to such users may be enabled in various manners. For example, the CIS service may in at least some embodiments, in addition to providing one or more content items for display on a Web page from a target Web site (or with another group of information from another type of target site), also provide an executable script or other information for use as part of the Web page to enable the authorized user to perform the login or other identification activities and/or to enable the restricted access functionality to be provided to the authorized user. Such an enabling script or other information may, for example, be provided to the target site by the CIS service before the Web page is provided to users, such as to enable the target site to integrate the provided enabling script or other information as part of one or more Web pages from the target site. Alternatively, such an enabling script or other information may, for example, be dynamically provided by the CIS service as part of a particular Web page, such as along with one or more content items being provided for that Web page—for example, one or more of the provided content items may have associated instructions to initiate the performance of one or more desired operations related to providing the restricted access functionality upon selection of that content item by the user, and may optionally further include an icon or other visual representation that the user may use to initiate the performance of such desired operations or to otherwise identify that such desired operations are available from that content item. Such content items from which restricted access functionality are available may be provided and used in place of other content items that include promotional material related to product/service items, or may be content items that include such promotional material related to product/service items in addition to providing the restricted access functionality.

The restricted access functionality that may be provided to authorized users by the CIS service may have various forms in various embodiments. In addition, the CIS service may enable a user to obtain access to such functionality in various manners, such as from a displayed content item with associated instructions, from another type of displayed user-selectable control (e.g., a control integrated into the Web page by the target site), etc. The providing of restricted access functionality may include, for example, one or more actions of the following non-exclusive list: display of one or more user-editable fields as part of the Web page or instead separately (e.g., as part of a separate window, such as a pop-up window), such as to allow the user to enter information that will be transmitted to the CIS service (e.g., login information or other identifying information); display of one or more types of restricted access information related to the selection and use of one or more of the selected content items (e.g., a particular content item that is selected to initiate the restricted access functionality), such as information about why those one or more content items were selected, information about historical promotional effectiveness of those one or more content items or other related analytics information, information about campaigns with which the content items are associated and related campaign criteria, etc; display of one or more types of restricted access information related to the selection and use of content items with the current Web page and/or with related Web pages, such as information about historical promotional effectiveness of content items displayed on the current Web page and/or on related Web pages (e.g., multiple Web pages that correspond to a category or genre of product/service items, that correspond to a particular online retailer or other target site, etc.); display of other restricted access information specific to the authorized user, such as information about an account of the authorized user with the CIS service; and display of one or more restricted access user-selectable controls to enable the authorized user to alter or otherwise influence the future selection of content items for this Web page and/or related Web pages (e.g., multiple Web pages that correspond to a category or genre of product/service items, that correspond to a particular online retailer or other target site, etc.). The restricted access user-selectable controls may, for example, enable an online retailer authorized user to perform one or more of the following non-exclusive list: specify filters on the content items to be selected and use for one or more of the Web pages of the online retailer's target site, such as filters related to attributes of the product/service items with which the content items are associated (e.g., based on price, product/service category or genre, brand, manufacturer, etc.), including to prevent particular content items from being selected for use on some or all parts of the target site or to otherwise prevent particular product/service items from being advertised on some or all parts of the target site; specify instructions related to targeting particular content items (e.g., to target the selection and use of particular content items or content items with particular attributes, including having particular associated product/service items, to specified users or to users with specified attributes, to specified product/service items or product/service items with specified attributes, to specified Web pages or to Web pages with specified attributes, etc.); specify instructions related to the selection of particular content items or content items with particular attributes, such as to positively or negatively boost the likelihood of those content items being selected (e.g., to positively or negatively boost the otherwise determined relevance of those content items as being recommended for particular situations), including to recommend that content items associated with a specific product/service item category or genre be selected and used with Web pages for particular other complementary product/service items or category/genres; etc. Additional details are included below related to providing restricted access functionality to authorized users, including with respect to the examples of FIGS. 2B-2E and FIGS. 4A-4E, as well as with respect to the example flow chart of FIG. 5. Furthermore, additional details related to types of functionality that may be available to at least some authorized users in some embodiments are included in co-pending U.S. patent application Ser. No. 12/151,375, entitled "System and Process for Boosting Recommendations for Use in Providing Personalized Advertisements to Retail Customers" and filed May 6, 2008, and in co-pending U.S. patent application Ser. No. 12/151,299, entitled "System and Process for Receiving Boosting Recommendations for Use in Providing Personalized Advertisements to Retail Customers" and filed May 6, 2008, each of which is incorporated herein by reference in its entirety.

Figure 4E:
Figure 4E:
Figure 4E:
Figure 4E:
Figure 5:
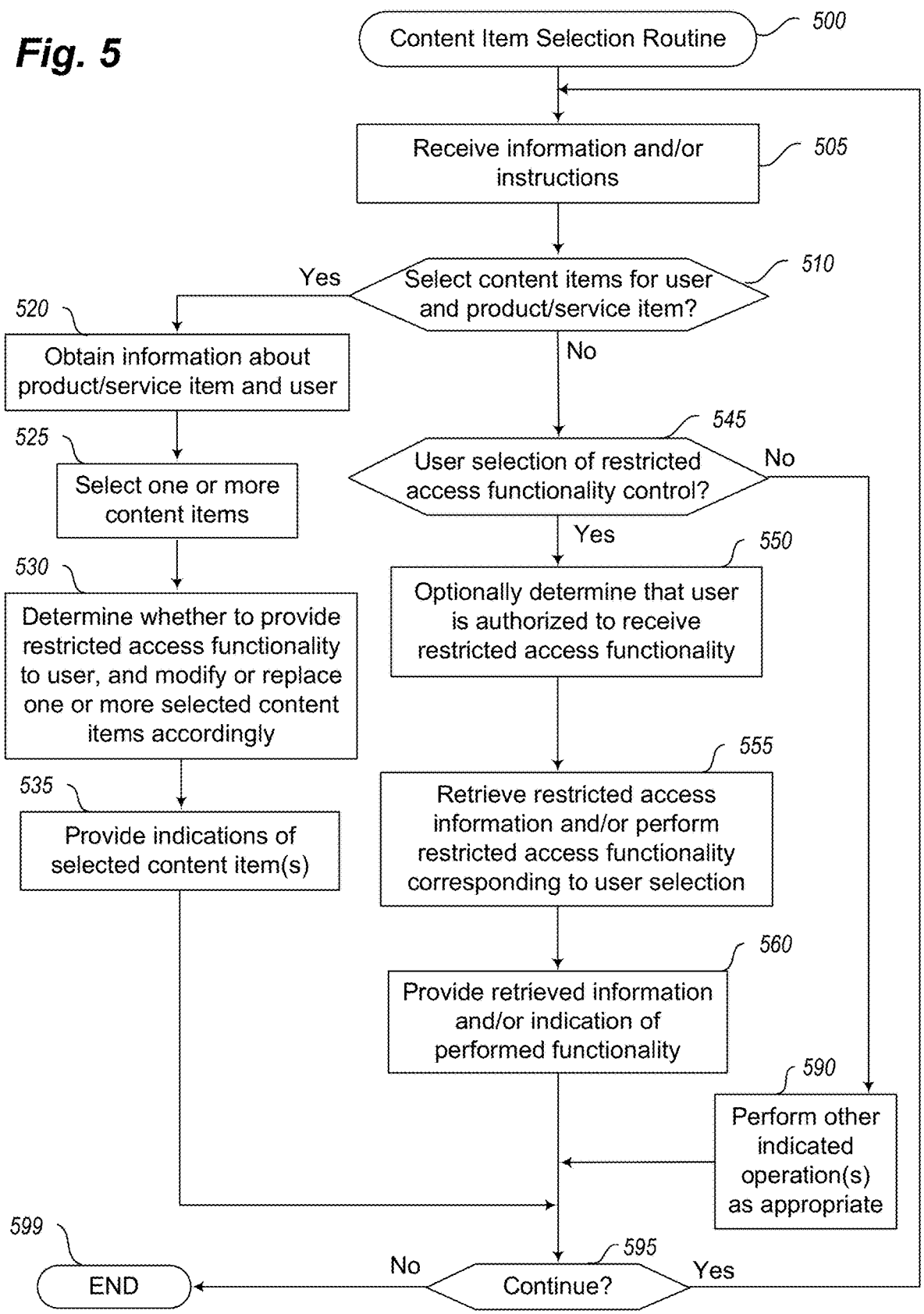
FIG. 5 is a flow chart of an example embodiment of a Content Item Selection routine.

FIG. 5 is a flow chart of an example embodiment of a Content Item Selection routine 500, such as to provide a high-level overview of some functionality of an example embodiment of the CIS service. The routine 500 may be performed, for example, by the Content Item Selection system 340 as it provides a CIS service and/or by the Content Item Selection service 105 of FIG. 1, such as to provide some or all of the functionality described below with respect to the examples of FIGS. 2B-2E and FIGS. 4A-4E, and more generally to provide the techniques described herein to provide restricted access functionality to users. In the illustrated embodiment, the routine 500 performs actions that include both of selecting particular content items to display or otherwise provide to users at particular times and of providing restricted access functionality to particular users in particular situations, although in other embodiments a distinct routine may instead perform the selection of some or all particular content items to display or otherwise provide to users at particular times (e.g., if the routine 500 receives or otherwise obtains information about the selections made by the other routine).

The routine 500 begins at block 505 in the illustrated embodiment, where one or more instructions and/or types of information are received. The routine then continues to block 510 to determine whether a request has been received to select one or more content items to display or otherwise present to a particular user, such as in conjunction with other information to be provided to the user regarding one or more particular indicated product/service items.

Figure 2A:
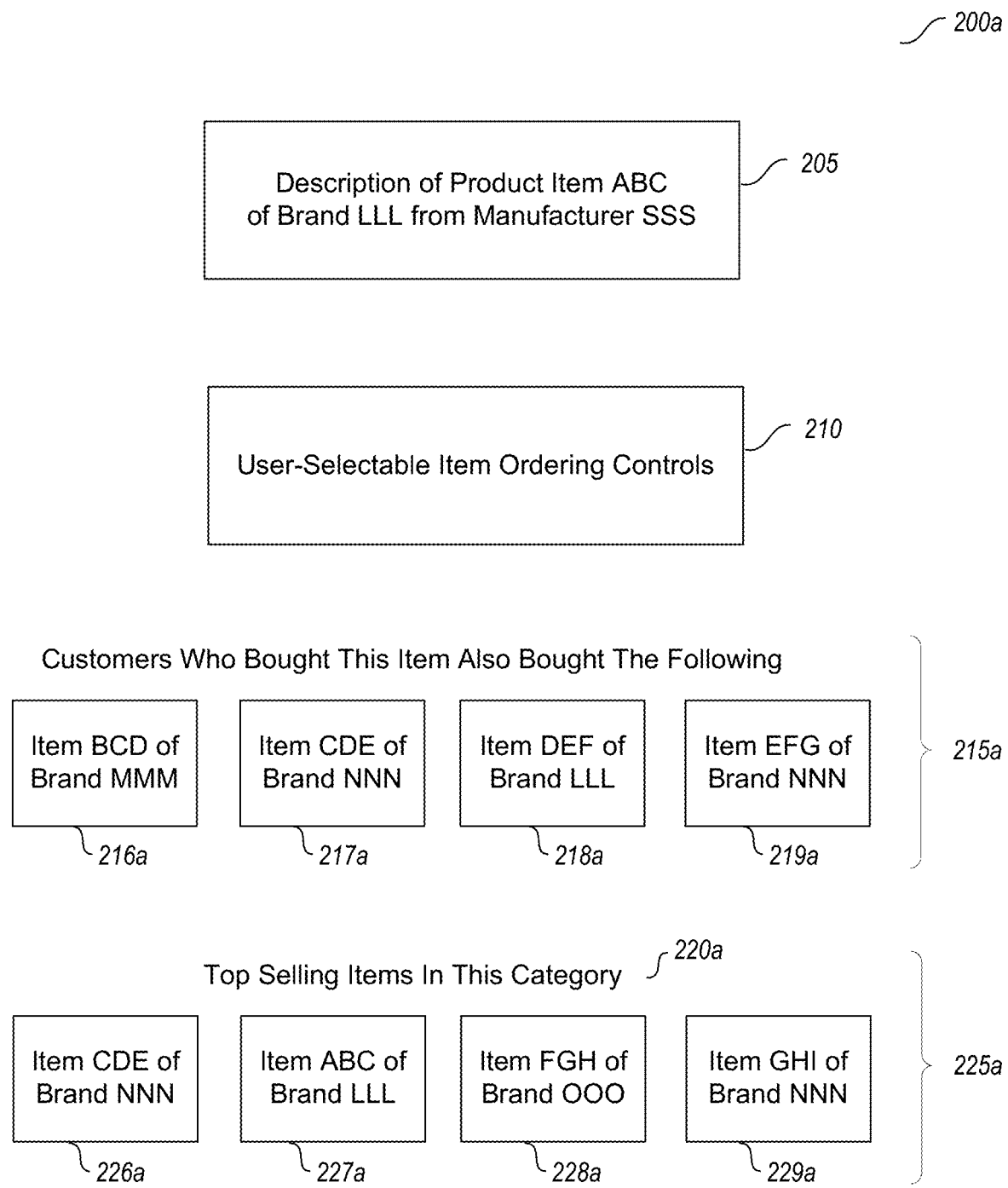
Figure 2C:
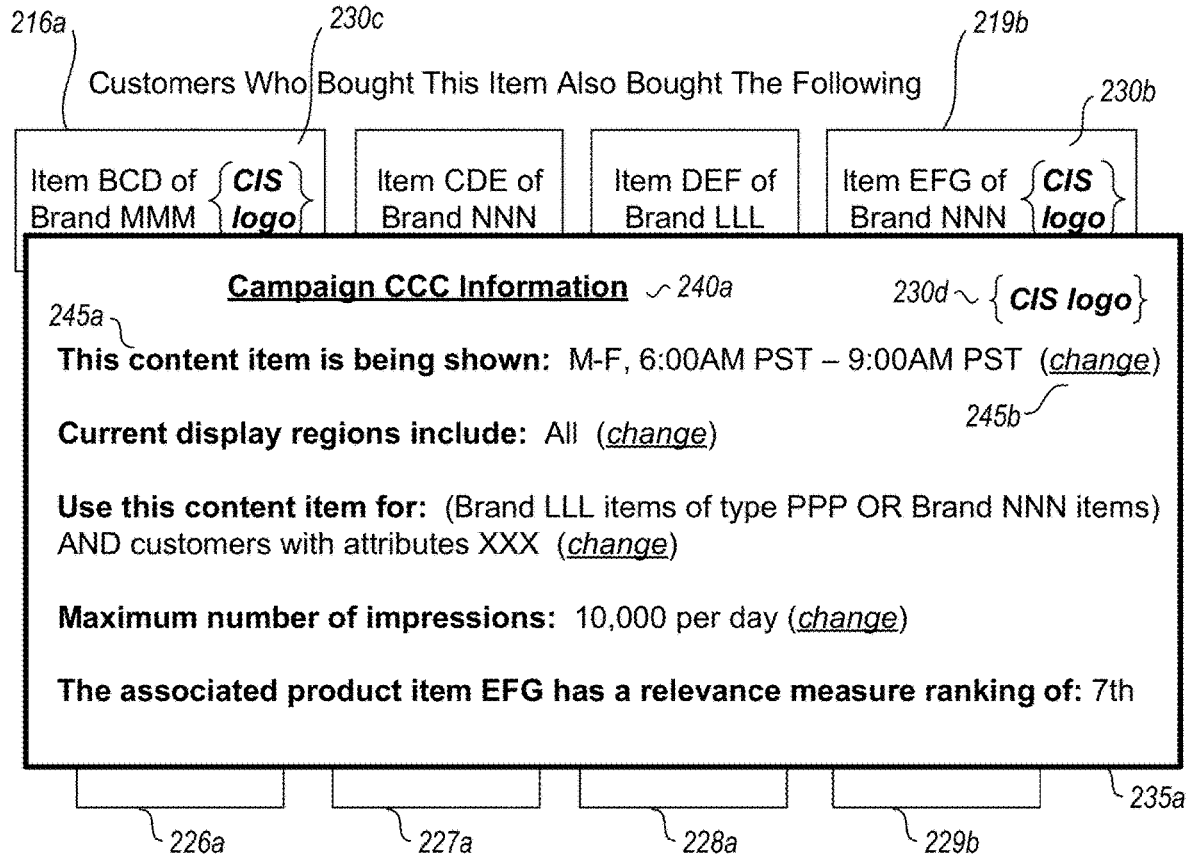
Figure 2D:
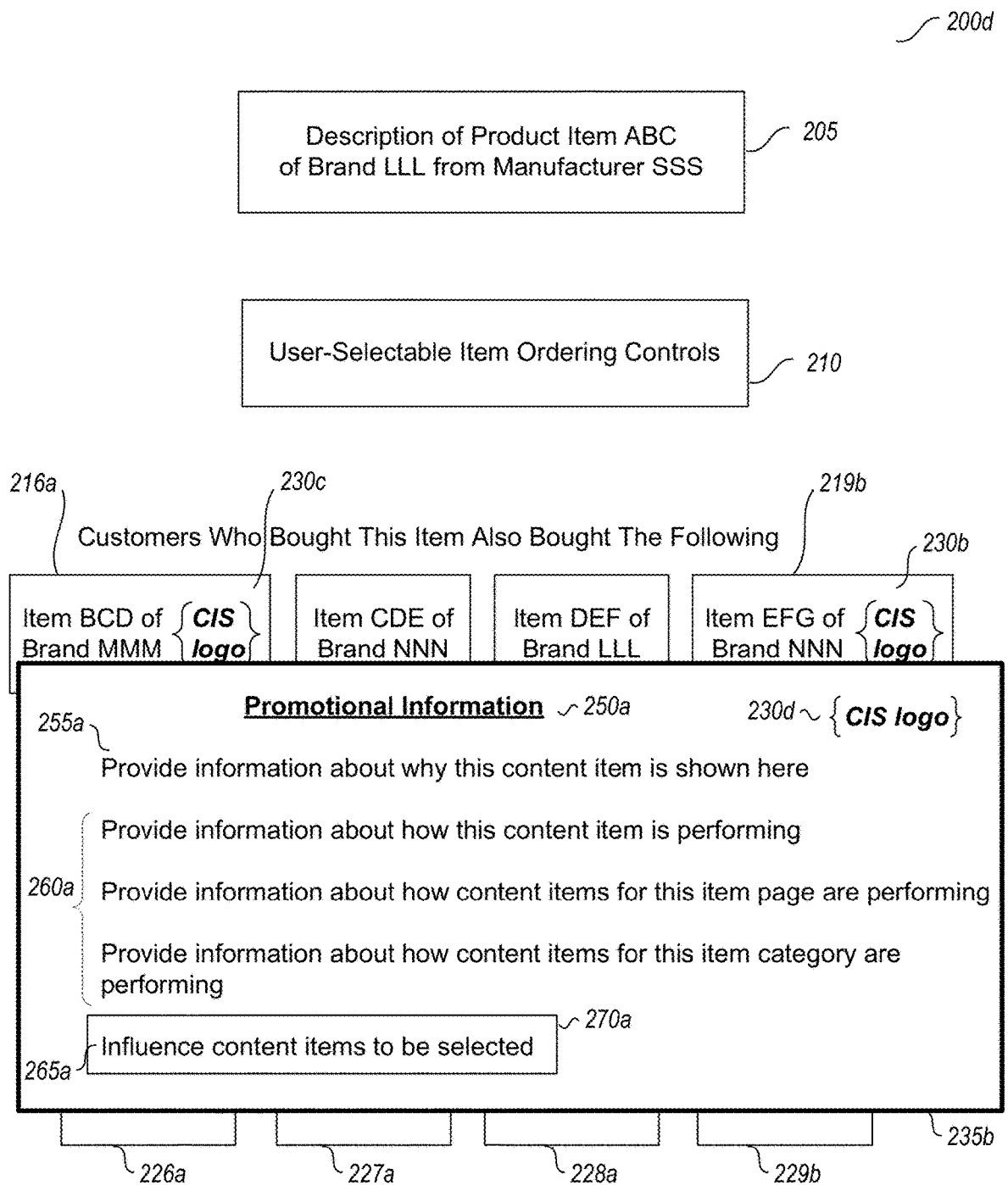
Figure 3:
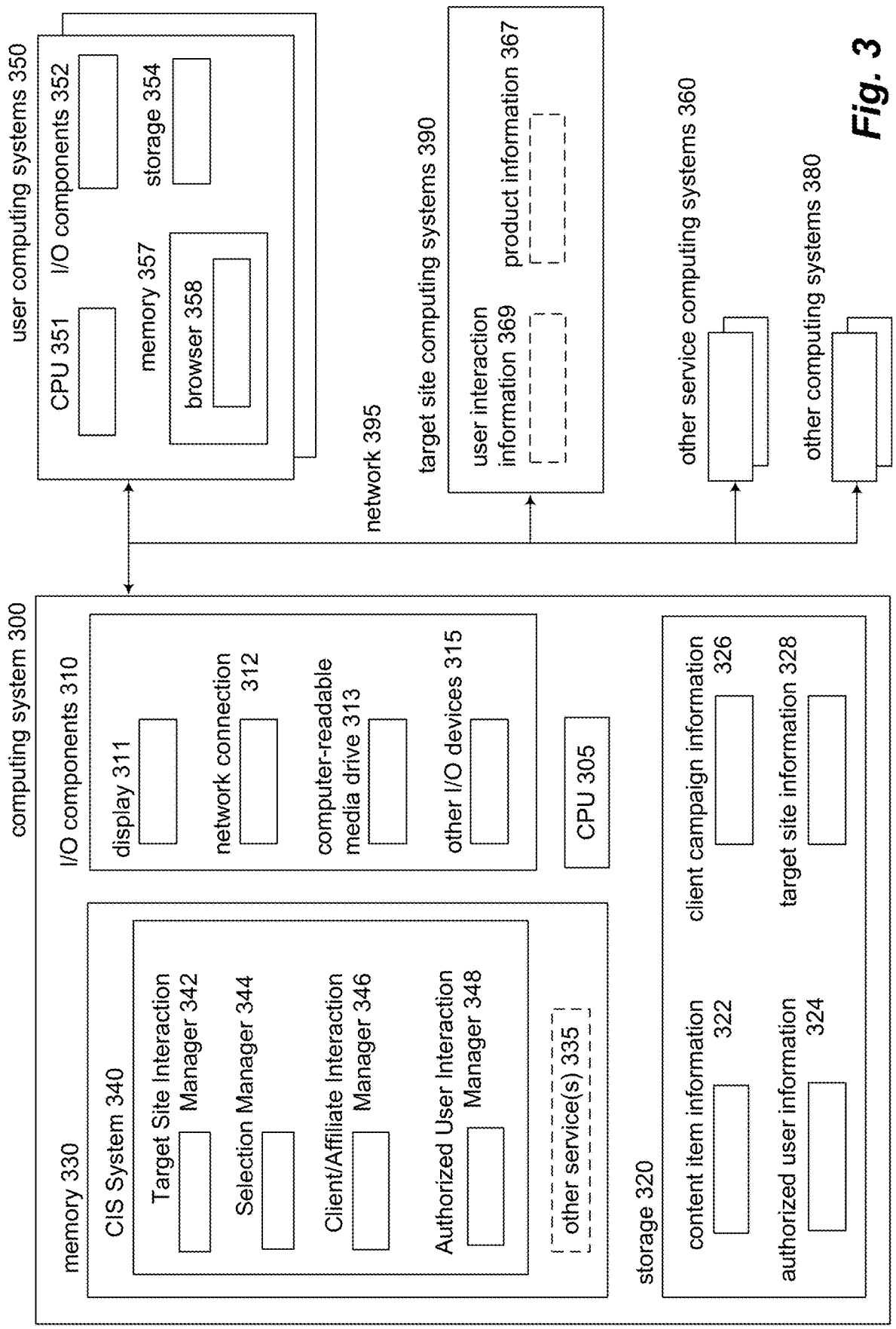
FIG. 3 is a block diagram illustrating example computing systems suitable for executing a content item selection system for dynamically selecting content items and for enabling user analysis and control of the content item selection.

If it is determined in block 510 that a request has been received to select one or more content items to display or otherwise present to a particular user, the routine continues to perform blocks 520-535 accordingly, such as by executing a selection manager module of the content item selection system (e.g., the Selection Manager module 344 of FIG. 3). In block 520, the routine obtains information about the user and product/service item(s) for use in determining other product/service items that are sufficiently relevant to recommend to the user, such as to receive some or all such information in block 505 and/or to retrieve stored information. In some embodiments, various additional information may be considered, as discussed in greater detail elsewhere, including a particular Web page or other information page on which the selected content item(s) will be displayed, a particular location on or within a particular Web page or other information page on which the selected content item(s) will be displayed, a particular target site that provides the Web page or other information page on which the selected content item(s) will be displayed, etc. In block 525, the routine then selects one or more content items for use, such as based at least in part on the product/service items that are associated with the selected content items being relevant for the indicated product/service item. As discussed in greater detail elsewhere, one or more recommendation strategies may be used to select particular content items. After block 525, the routine continues to block 530 to determine whether to provide restricted access functionality to the user, such as one or more types of restricted access information and/or user-selectable restricted access controls, and if so modifies and/or replaces one or more of the selected content items to provide the restricted access functionality. One or more indications of the content item(s) that are selected in block 525 and optionally modified/replaced in block 530 are then provided in block 535 to the requester, such as enable their display as part of a Web page or other information page to be displayed to the user (e.g., a Web page that is provided by a retailer or other target site). The routine may determine whether the user is authorized to obtain restricted access functionality in various manners, such as based on the user having previously provided login information or other identifying information to verify an identity or other authorization basis for the user, as discussed in greater detail elsewhere. In addition, particular content items may be modified or replaced in various manners in other to provide restricted access functionality to the user, such as is described in greater detail with respect to FIGS. 2B-2E and elsewhere. It will be appreciated that the described functionality with respect to blocks 520-535 may be performed in other orders and manners in other embodiments, including to determine whether to provide restricted access functionality before selecting any content items, and/or to modify previously indicated selected content items to subsequently provide restricted access functionality (e.g., after a user has performed login activities or otherwise demonstrated authorization to receive particular restricted access functionality). It will also be appreciated that restricted access functionality may further be provided to users in manners other than via use of selected content items in other embodiments and situations, and that in some embodiments the operations of at least block 525 may be performed by another routine.

If it is instead determined in block 510 that the instructions/information received in block 505 are not to select particular content items, the routine continues to block 545 to determine whether the instructions/information received in block 505 are a request to provide restricted access functionality to a particular user, such as based on selection by the user of a user-selectable restricted access control that was previously provided to the user with respect to blocks 530 and 535, or based on another indication of particular restricted access functionality of interest.

If it is determined in block 545 that the instructions/information received in block 505 are a request to provide restricted access functionality to a particular user, the routine continues to perform blocks 550-560 accordingly, such as by executing an authorized user interaction manager module of the content item selection system (e.g., the Authorized User Interaction Manager module 348 of FIG. 3). In block 550, the routine optionally determines that the user is authorized to receive particular restricted access functionality, such as based on prior or current identification of the user and/or of access rights of the user, and if not may skip (not shown) the performance of blocks 555 and 560 or otherwise modify any restricted access functionality that is provided. For example, in some embodiments a user may be allowed to provide login information or other identifying information at the same time as requesting one or more types of restricted access functionality, although in the illustrated embodiment those types of interactions instead occur sequentially (e.g., with the user previously providing login information or other identifying information before the request for restricted access functionality for the user, such as with respect to block 590). In block 555, the routine performs at least one of retrieving restricted access information corresponding to the request for the user and of performing restricted access functionality corresponding to the request for the user (e.g., in accordance with instructions or other information supplied by the user), and in block 560 provides the retrieved information and/or information about the performance of the restricted access functionality to the user. The restricted access functionality that is provided to the user may have various forms in various embodiments, including to vary based on the particular user and the user's level or type of authorization, as discussed in greater detail with respect to FIGS. 2B-2E, FIGS. 4A-4E, and elsewhere. In at least some embodiments, the restricted access functionality may be requested by a user based on selection of a control that is displayed on a Web page from a retailer or other target site, and the restricted access functionality that is provided will be based at least in part on the context of the user at that target site (e.g., on particular information that the user selects or otherwise indicates on that Web page, or that is otherwise displayed on that Web page, such as with respect to one or more target product/service items for which content items are selected for display, including particular target items and/or categories or other groups of target items, and/or such as with respect to one or more content items that are selected for display or are not selected for display). It will be appreciated that the information provided in block 560 may include user-selectable restricted access controls that the user may subsequently select in order to receive additional later restricted access functionality. It will also be appreciated that the restricted access functionality of block 555 may be obtained by particular users in at least some embodiments and situations in manners other than based on using previously provided user-selectable restricted access controls, such as based on use of a separate user interface provided by the CIS service to authorized users.

If it is instead determined in block 545 that the instructions/information received in block 505 are not a request to provide restricted access functionality to a particular user, the routine continues to block 590 to optionally perform one or more other indicated operations as appropriate. Such other operations may include, for example, receiving login information or other identifying information from a user or otherwise on behalf of a user (e.g., based on interaction by the user with one or more login-related user-selectable controls previously provided by the CIS service to the user, such as in conjunction with one or more selected content items previously provided for display to the user on a Web page) and determining whether the user is authorized (and optionally determining a level or type of authorization of the user), receiving and storing information for later use (e.g., information about users for use in future determinations of whether they are authorized to obtain restricted access functionality, and if so what kinds; information about particular content items and associated product/service items, such as for use in future selection of particular content items; etc.); providing functionality to clients related to accounts with the CIS service or otherwise interacting with advertising clients, such as by executing a client/affiliate interaction manager module of the content item selection system (e.g., the Client/Affiliate Interaction Manager module 346 of FIG. 3); providing executable scripts to target site operators for incorporation in the target sites or otherwise interacting with target site operators, such as by executing a target site interaction manager module of the content item selection system (e.g., the Target Site Interaction Manager module 342 of FIG. 3); performing periodic housekeeping operations, etc. After blocks 535, 560 or 590, the routine continues to block 595 and determines whether to continue, such as until an explicit termination indication is received. If it is determined to continue, the routine returns to block 505, and otherwise continues to block 599 and ends.

Use of the described techniques may provide various benefits to users, including efficient access to restricted access functionality. As noted above, in at least some embodiments and situations, the illustrated routine provides restricted access functionality to at least some users while those users are interacting with Web pages or other information from a particular retailer Web site or other target site, such as to provide restricted access functionality that is based at least in part on a current context of the user. By enabling a user to access restricted access information and/or controls from particular locations of an online retailer's Web site or other target electronic site, the user may be enabled to more efficiently access and control desired information, as is discussed in greater detail below.

In addition, different authorized users may be provided with different types of restricted access functionality, in at least some embodiments. For example, if one or more content items that are part of a first client's campaign are selected for display on a Web page of a target Web site of a second online retailer, a user representative of the first client may be provided with restricted access functionality to review and modify various details of the first client's campaign but not to control how other clients' content items are displayed on the target Web site, while a user representative of the second online retailer may be provided with restricted access functionality to specify various controls regarding how various content items are displayed on portions of the target Web site but not to otherwise alter the first client's campaign or control how content items are selected for other target sites. In addition, a first user representative of the second online retailer may be designated by the second online retailer as having all restricted access functionality that is available to the second online retailer, while a second user representative of the second online retailer may be designated by the second online retailer as having only a subset of the restricted access functionality that is available to the second online retailer (e.g., functionality to view restricted access information about prior content item selection but not to alter future content item selection). If different authorized users are provided with different types of restricted access functionality, the CIS service may perform additional related types of operations, such as to determine particular restricted access functionality to particular authorized users in particular situations, including based on instructions specified by affiliated target sites and/or clients.

It will be appreciated that the enabling of user analysis and control of content item selection may be performed in other manners in other embodiments, as discussed in greater detail elsewhere.

The selecting of particular content items may in some embodiments be performed based at least in part on campaigns or other information specified by clients of the CIS service. Such clients may, for example, include particular companies or other entities that desire to promote particular content items (e.g., manufacturers of product items with which the content items are associated, advertisers who provide content items associated with particular product items or service items, etc.). In at least some embodiments, such a client may specify one or more criteria that indicate particular situations in which one or more particular content items are desired to be presented, with such criteria optionally including fees that the client has paid and/or is willing to pay to promote visibility of particular content items in those particular situations. A non-exclusive list of criteria and related information for a campaign includes the following, with a particular client able to specify one or more such information types in at least some embodiments: restrictions on the product/service items for which associated content items are allowed to be presented as part of the campaign (e.g., based on particular product/service items; or based on product/service items that have specified attributes, such as a specified brand affiliation, a specified manufacturer, minimum and/or maximum price, a minimum and/or maximum number of user reviews, a minimum and/or maximum average rating from users, a minimum and/or maximum recommendation relevance or other evaluation score from other targeted recommendation strategies or techniques, etc.); restrictions on which content items are allowed to be presented as part of the campaign (e.g., based on particular content items, based on content items that have particular specified attributes, etc.); particular content items or other information to be displayed with selected content items (e.g., a company or brand logo; a GUI, or "graphical user interface," skin; text or other information to be displayed along with one or more content items selected based on the campaign, such as in place of other default text or other information that would otherwise be selected; etc.), and optionally a particular aggregation form with which to present multiple related content items or other information; restrictions on particular target site uses with which the campaign may be used (e.g., particular target sites; target sites that have particular attributes; particular conceptual portions of target sites, such as particular categories, types or genres of product/service items; particular structural locations within the target sites, such as the Web site home page versus particular item-specific pages; particular parts of a target site Web page; etc.); restrictions on when and/or how often content items are selected and used based on the campaign (e.g., a specified duration of the campaign; particular time periods during which the campaign is active; a maximum number of times to display content items for the campaign; a maximum or target probability that a content item will be selected for the campaign if the content item qualifies as being available for selection based on the campaign; etc.); one or more prices that the client is willing to pay for one or more selections and uses of a content item as part of the campaign (e.g., a specified per-use price or price for a specified number of uses; minimum and/or maximum such prices; a price for a specified duration or other period of time, such as a daily maximum or a lifetime cap; etc.); etc. In addition, embodiments of the CIS service may enable clients to specify criteria in various manners in various embodiments, including to provide a corresponding GUI in at least some embodiments to enable clients to interactively specify particular criteria (e.g., as part of an account that a client establishes with the CIS service), and/or to provide one or more programmatic interfaces (e.g., Web services APIs, or application programming interfaces) to enable software programs of clients to programmatically specify particular criteria. Furthermore, in at least some embodiments, the restricted access functionality available from at least some Web pages or other information groups from target sites may be used to enable at least some clients to specify at least some criteria for at least some campaigns.

A particular campaign may be used to display one or more particular content items in one or more manners, such as to display a single particular content item in a particular location, to display a group of multiple related content items together in one or more locations, and/or to specify that multiple content items of multiple types are to be presented together in a specified aggregated manner. As a first example, a particular client may in some embodiments and situations indicate a particular content item that is of interest to be displayed in particular situations, such as a content item that includes promotional material for a particular item (e.g., a product and/or service item that is available for sale)—for instance, the situations of interest in which to present the particular content item may include when information about other related items is being or has recently been presented (e.g., other items by the same manufacturer or brand, related items from competitors, etc.). If the content item is presented to a consumer user in such situations, the content item may influence the consumer user to subsequently purchase the particular item that is associated with the presented content item (e.g., the consumer user may click or otherwise select the presented content item and receive additional information about the associated item, such as to prompt the consumer user to proceed to purchase the associated item; the consumer user may later decide to purchase the item associated with the presented content item, such as in an offline manner at a brick-and-mortar retailer; etc.). As a second example, in some embodiments and situations, a particular client may indicate a group of multiple related content items that are of interest to be displayed in particular situations, with the content items including promotional material for one or more related product/service items—for instance, a client may desire that multiple content items for multiple related items (e.g., for multiple products that are part of a single brand or otherwise provided by a single company) be displayed together in particular situations (e.g., when information about other related items is or has recently being presented, such as other items by the same manufacturer or brand, related items from competitors, etc.). By displaying multiple content items for the multiple related items, the likelihood of one of those related items being selected instead of other items (e.g., competitors' items) may be significantly enhanced. As a third example, in some embodiments and situations, a particular client may specify multiple content items of multiple types that are to be presented together in a specified aggregated manner in particular situations—for instance, a client may desire to display particular content items together in a single window or other particular aggregation form in particular situations (e.g., when information about other related items is or has recently being presented, such as other items by the same manufacturer or brand, related items from competitors, etc.). A particular displayed aggregation of multiple content items may include, for example, a logo content item of the client, one or more advertisement content items that include text and/or images, a GUI skin content item for use with some or all of the displayed aggregation, a video content item to be played or otherwise presented within the displayed aggregation, etc. By enabling the client to specify multiple related items to be presented together in an integrated manner, greater influence may be achieved over subsequent selection by consumer users of associated product/service items.

Various product/service item targeted recommendation strategies may also be used to evaluate the relevance of particular product/service items to recommend to particular users in particular situations. For example, the content item selection techniques of the CIS service may in some embodiments operate in conjunction with other techniques for selecting advertisements for display, such as one or more product/service item targeted recommendation strategies. Such product/service targeted recommendation strategies may in some embodiments be based at least in part on data regarding prior interactions of numerous users with numerous items, such as the interactions of customers of one or more retailers related to products or other items that are available from those retailers, or instead interactions of other types of users in other situations (e.g., users who perform searches with search engines, users who view information about products from a product review service, etc.). A non-exclusive list of types of interactions of customers of online or other retailers with items for which interaction data is gathered may include, for example, the following: performing searches (e.g., for particular items, for items of a particular category or other defined group of items, for items having one or more indicated attributes, etc.); browsing item categories; viewing detailed information about particular items; purchasing items; doing item returns; etc. The interaction data about the prior user interactions with items may then be analyzed and summarized in various ways, such as, for example, in the following non-exclusive manners: to identify items that are popular (e.g., the top item sellers in a particular category or from a particular retailer during a particular period of time; the items that are most often selected by users, such as to view detailed information about the items; the items with the highest user ratings; the items most often included in results of users' searches and/or selected by users from such search results; the "hottest" items of an item group to reflect those items having the largest changes in their ratings or sales or other popularity measure during a particular period of time; etc.); to identify items that are similar to each other or otherwise related to each other (e.g., items that have similar or otherwise related items attributes, such as price, type, size, etc.; users who viewed this item are most likely to also view these other items; users who viewed this item are most likely to purchase these items; users who purchased this item are most likely to also purchase these other items; users who searched for this item attribute and/or browsed this item category are most likely to view and/or purchase these items or items with these attributes or items in these categories; etc.); to identify items that are popular among users similar to a user for whom targeted recommendations are being made (e.g., users with similar demographics; users in the same or nearby geographic regions, etc.); to identify items that have been explicitly associated with one another, such as by a retailer, an advertiser, a manufacturer, and/or another user (e.g., "buy together" items); to identify items that are similar or otherwise related to items interacted with by a particular user, such as a user to whom targeted recommendations are to be provided (e.g., interactions related to items purchased by the user, items viewed by the user, items added to a shopping cart of the user, etc.); etc. Some or all of the various types of analyzed or summarized user interaction data may then each be used as a distinct targeted recommendation strategy, such as to use information about top item sellers in a particular category as one targeted recommendation strategy when a user interest in that category is indicated or suspected, to use information about users who viewed a particular item as being most likely to purchase other identified items as one targeted recommendation strategy when a user interest in that particular item is indicated or suspected, etc.

Multiple recommendation strategies may be used together in various ways in various embodiments to select particular content items for particular users. For example, in some embodiments and situations, recommendation results from multiple available targeted recommendation strategies may be gathered for a particular situation involving a particular user, and then those various targeted recommendation results may be aggregated in various manners. As one example of aggregating various recommendation results from multiple recommendation strategies, the various recommendation results may be weighted or otherwise ranked, so as to determine relevance scores or other relevance levels for those recommendation results, and then some or all of those various recommendation results may be selected to be used as recommendations for that user based on those weightings or other rankings. The weighting or other ranking of various item recommendation results may be performed in various manners, such as based on a weighting or ranking provided by a particular recommendation strategy that recommended the item (e.g., with a top sellers recommendation strategy weighting the highest item seller as the top recommendation for that strategy, and progressively weighting lower sellers as lower recommendations), based on inclusion of a particular item recommendation in the results from multiple different recommendation strategies, etc. In other embodiments, relevance scores or other levels may be determined for particular recommended items in manners other than based on weighting or other ranking. In addition, in other embodiments, a particular one of multiple available recommendation strategies may instead be selected for use in a particular situation, such as based on a dynamic determination that the particular recommendation strategy is optimal or otherwise preferred for the particular situation, or instead based on a prior selection or configuration to use that particular recommendation strategy in that particular situation (e.g., based on prior configuration by a human operator, based on a prior automated selection of that particular recommendation strategy, etc.). A dynamic determination to use a particular recommendation strategy at a given time based on a current situation may be based on, for example, a comparison of the results from the recommendations of that particular recommendation strategy to recommendation results from one or more other possible recommendation strategies, a failure or other inability of other possible recommendation strategies to provide useful recommendation results or any recommendation results, etc. Additional details related to example embodiments of using various recommendation strategies are included in co-pending U.S. patent application Ser. No. 12/415,896, entitled "Multi-Strategy Generation of Product Recommendations" and filed Mar. 31, 2009, which is hereby incorporated by reference in its entirety.

In some embodiments, the CIS service may operate in conjunction with one or more other recommendation strategies by determining to use one or more content items in particular situations that the recommendation strategy(ies) have identified as alternative candidates for use but have not selected as primary content items. In particular, one or more targeted recommendation strategies may be used to evaluate content items in one or more manners (e.g., based at least in part on product/service items with which the content items are associated) and to determine particular content items that are alternatives for selection and use (e.g., based at least in part on the evaluation scores). In such a situation, the CIS service (or a related product/service item targeted recommendation service) may determine a first group of one or more content items that are initially the primary candidates for selection and use (e.g., the top five content items according to a specified evaluation scheme), may determine a second group of one or more other content items that are alternative candidates rated below the primary candidates of the first group (e.g., the next five content items according to the specified evaluation scheme), and optionally may determine a third group of one or more further other content items that are rated below the content items of the second group (e.g., if the content items of the second group are selected to be above a specified minimum threshold, and content items that are not above that minimum threshold are placed in the third group, such as all content items below the top ten in this example). In some such embodiments, the described content selection techniques of the CIS service may be used to identify alternative candidate content items from the determined second group that will be selected and used (e.g., in place of primary candidate content items from the determined first group), such as based on those identified alternative candidate content items satisfying the criteria for one or more specified campaigns, but may not identify content items from the determined third group to be selected and used. In other embodiments, the described content selection techniques of the CIS service may be used to identify content items that will be selected and used regardless of whether those content items are part of the second group (e.g., have at least a minimum specified degree of relevance), such as if one or more of the selected content items are from the determined third group, or if one or more content items are selected without determining at least one of the described first, second and third groups.

The CIS service may perform a monetary costs-benefits analysis when determining whether to use particular content items promoted by particular client campaigns and other possible content items that may be selected in some embodiments. For example, using one or more product/service item targeted recommendation strategies, a group of one or more content items may be selected for use in a particular situation, such as 5 content items that are advertisements corresponding to the 5 top-selling products in a particular category. A determination may also be made of the expected value of presenting each of these 5 content items to a consumer user in a particular situation, such as by using expected click-through rates and conversion rates of consumer users selecting a particular such content item (e.g., the fourth-highest top selling product) and proceeding to purchase the product/service item to which the content item corresponds, along with a corresponding profit margin for the product/service item (e.g., an average profit margin for products/services in this category, an actual profit margin for the specific product/service item to which the content item corresponds, etc.)—such a determination may, for example, represent a value to a particular target site of displaying a particular content item in a particular manner, and/or may represent a value to the CIS service of displaying a particular content item in a particular manner. However, a particular client of the CIS service may have specified a campaign that alters the costs-benefit analysis for the content item(s) that are part of the campaign, thus altering the group of content items that may be selected for use in a particular situation. For example, consider the case of a particular alternative content item that is part of a campaign and is associated with a particular product/service item, with the associated item being evaluated to be the seventh top-selling product in a particular category, such that displaying this alternative content item in place of a content item associated with the fourth-highest top selling product for the category in a particular situation may result in a lower expected value from the display (e.g., based on the alternative content item for the seventh-highest top selling product having a lower expected click-through rate and/or conversion rate relative to the content item associated with the fourth-highest top selling product, based on the seventh top-selling product having a lower profit margin than the fourth-highest top-selling product, etc.)—however, if the client is willing to pay a sufficient fee for such a display associated with the campaign (e.g., a fee that is greater than the difference between the expected values of displaying the content items for the fourth-highest and seventh-highest top selling products), the costs-benefits analysis may instead determine that the overall expected value of displaying the alternative content item for the seventh-highest top selling product is greater than that from displaying the content item for the fourth-highest top selling product (after the campaign-related fee(s) are considered). In such a situation, some or all of the greater overall expected value may be provided to the target site on which the content item display occurs and/or some or all of the greater overall expected value may be retained by the CIS service. Conversely, if a different second content item is associated with a different second campaign, but the product/service item with which the second content item is associated has a lower determined recommendation relevance value (e.g., is the fiftieth-highest top selling product in the particular category), the fee that a client is willing to pay for this second campaign is less likely to be sufficiently high to cause the expected value from using this second content item in place of the content item for the fourth-highest top-selling product to exceed the expected value from using that content item for the fourth-highest top-selling product, but in some embodiments and situations may nonetheless be sufficiently high to cause a greater overall value to be achieved from the selection and use of the second content item in place of the content item for the fourth-highest top-selling product (or some other of the 5 top-selling product/service items in a particular category).

It will be appreciated that the determination of whether and when to select and use particular content items from particular campaigns may be made in other manners in other embodiments, as discussed in greater detail elsewhere.

FIG. 1 is a network diagram illustrating an embodiment of a content item selection service for dynamically selecting content items to use in particular situations and for enabling user analysis and control of the content item selection in various manners. With respect to at least some embodiments below, the discussion may refer to selecting content items associated with products and displaying those selected content items to users, but it will be appreciated that the same or similar techniques may be applied to other types of items and for other types of uses in other embodiments.

The illustrated example of FIG. 1 includes a number of example users 140 that are each interacting with one or more Web sites or other target sites 130 over one or more intervening networks 100, such as to obtain Web pages or other electronic information from those target sites 130 and to optionally engage in commerce activities with those target sites 130. In particular, some or all of the example target sites 130 may be provided by one or more online retailer businesses that sell or otherwise make products or other items available to customers or potential customers, such as via a Web site (e.g., a Web store) or other network-based service hosted on one or more server computing systems. For example, the users 140 may access a Web site 130 of a retailer to obtain one or more Web pages, such as to view information about, search for, browse for, rate, place an order for, and/or provide information for completing a purchase of or a return of one or more products or other items available from the retailer. As discussed in greater detail elsewhere, the information provided to the users 140 from the retailer target sites 130 may include content items selected by the service 105, with FIGS. 2A-2E and FIGS. 4A-4E providing examples of types of content item selections and related uses that may be provided in some embodiments. In addition, in at least some such embodiments, information about various of the interactions of the users 140 with a retailer Web site 130 may be collected and included by the service 105, such as interactions of the users that are related to the products or other items made available on the retailer Web site 130 (e.g., product views, purchases, returns, ratings). In other embodiments, some or all of the users 140 may obtain displayed or otherwise presented information from target sites 130 in manners other than via personal computing devices of the users, such as if those users are at a physical retail location and interact with one or more publicly accessible device(s) at the physical retail location (e.g., a fixed-location kiosk provided by the retailer, a mobile wireless device belonging to the retailer, etc.) in order to view and/or interact with selected content items from the service 105, as well as product information and related content from the retailer.

As part of providing Web pages to users, the target sites 130 may select and provide content items (e.g., content items associated with particular selected products) for display on at least some of the Web pages provided by the target sites 130 to the users. In particular, the target sites 130 in this example have previously established an affiliation with an example embodiment of a Content Item Selection ("CIS") service 105 and/or with one or more other optional product/service item recommendation services 195 (e.g., services that provide targeted product recommendations for particular users and/or particular situations), so that the services 105 and/or 195 may select and optionally provide particular content items in particular situations. The interactions between a target site, a user 140, the CIS service 105 and the other services 195 may occur in various manners in various embodiments, such as for a target site to request the selection of one or more content items for presentation to one or more users, for a user's computing device to request one or more selected content items for presentation to the user (e.g., upon display of a Web page or other information from a target site), etc. In addition, a particular target site 130 may interact with only one of the service 105 and a service 195 in some embodiments, with that service interacting as appropriate with the other service before responding to the target site 130. Alternatively, the target site 130 may interact with both of the service 105 and service 195, the service 105 and service 195 may in some embodiments be integrated as a single service, or the optional other services 195 may not be used. In yet other embodiments, the service 105 may have other forms, such as to be included as part of a particular target site 130 (e.g., to provide the described techniques for that target site on behalf of its users). In addition, in some situations and embodiments, some or all of the users 140 may optionally interact directly with the CIS service 105, such as to request and receive particular selected content items from the CIS service 105 (e.g., based on a request initiated by the user; based on a request initiated by a Web page provided to the user from a target site 130, such that display or other presentation of the Web page on the user's computing device, not shown, causes the request; etc.).

The example network 100 may have various forms. In this example, the network 100 is a publicly accessible network of linked networks, possibly operated by various distinct parties, such as the Internet, although in other embodiments the network 100 may have other forms. For example, the network 100 may instead be a private network, such as, for example, a corporate or university network that is wholly or partially inaccessible to non-privileged users. In still other embodiments, the network 100 may include both private and public networks, with one or more of the private networks having access to and/or from one or more of the public networks. Furthermore, the network 100 may include various types of wired and/or wireless networks in various situations. In this illustrated example of FIG. 1, the users 140 may each use computing systems and/or devices (not shown) to interact with the target sites 130 and optionally the service 105 to obtain various described functionality via the network 100, and in doing so may provide various types of information to the service 105.

In addition, various authorized users 150 may also interact with the CIS service 105 and/or various retailer sites 130 over the network 100 in order to control and analyze how content item selection occurs in the illustrated embodiment. For example, at least some of the authorized users 150 may represent clients of the service 105 who provide or otherwise designate particular content items to be displayed to users in particular manners, such as to specify particular campaigns associated with content items and/or product/service items in exchange for fees paid by those clients—such interactions of those users with the service 105 may occur in various ways in various embodiments, such as, for example, in an interactive manner via a GUI that is provided by the CIS service 105 and displayed on computing systems and/or other devices of those users 150, or in a programmatic manner via an API ("application programming interface") provided by the CIS service 105 that allows computing systems and/or programs of those users 150 to invoke such functionality programmatically, such as using Web services or other network communication protocols. In addition, at least some of the authorized users 150 may represent retailer sites or other target sites 130 that are affiliated with the CIS service, such as to analyze and control how content items are selected for display on their sites and to analyze the effects of such selection. Such affiliate authorized users may similarly interact with the service 105 in various ways in various embodiments, such as, for example, in an interactive manner via a GUI that is provided by the CIS service 105 and displayed on computing systems and/or other devices of those users 150, or in a programmatic manner via an API provided by the CIS service 105 that allows computing systems and/or programs of those users 150 to invoke such functionality programmatically, such as using Web services or other network communication protocols. In addition to interacting directly with the CIS service 105 to obtain access to various restricted information and controls, at least some such authorized users may further obtain access to some or all such restricted information and controls via various target sites 130, as discussed in greater detail below. As part of interacting with such authorized users, the CIS service 105 may use various authorized user information 170 to determine whether a particular user is authorized to obtain any restricted access functionality, and if so to determine what restricted access functionality to provide in a particular situation.

The example CIS service 105 of FIG. 1 may have access to various information used in the selection of particular content items in particular situations. In particular, the service 105 and/or recommendation service(s) 195 have access to information about various content items that are available for display via the target sites 130 in this illustrated example, such as may be included as part of the content item information 160 of the service 105 and/or other similar information (not shown) of the service(s) 195—such information 160 may include some or all of the actual content items that will be selected and then provided by the service 105 (e.g., as previously received from clients as part of campaign definition activities) and/or may include information about content items to enable the described content item selection techniques to be performed, but with the actual content items stored elsewhere (e.g., by the target sites 130; on the computing devices of users 140 and/or of authorized users 150; on other network-accessible computing or storage systems, not shown; etc.). Some or all of the content items in this example may be advertisements related to products available from the retailer target sites 130, although in other embodiments and situations, some or all of the content items may not correspond to products available from the retailer target sites 130 (e.g., may be advertisements for other products or services, such as other products/services that are competitors to or complementary to products/services available from the retailer target sites 130, or instead may be one or more types of non-advertisement information). In addition, in this example, the service 105 includes additional information to enable the described content item selection techniques, including information 165 specific to particular target sites (e.g., information about particular target site Web pages or other locations on which selected content items may be displayed), client campaign information 175 related to defined content item visibility campaigns of clients, and optionally other information that is not illustrated (e.g., historical user interaction information, such as to determine expected values of displaying content items to users based on expected click-through rates and/or conversion rates; various product information, such as a database and/or other data collection related to a catalog of product items and/or service items available from one or more retailer target sites 130 that may optionally include descriptions, prices, availability and other information about the products and/or services; etc.). Additional details related to selection of particular content items are included elsewhere.

At least some authorized users 150 may obtain access to some or all restricted information and controls via various target sites 130, whether in addition to or instead of interacting directly with the CIS service 105 to obtain such restricted access functionality. In particular, in a manner similar to users 140, those authorized users 150 may each interact with one or more Web sites or other target sites 130, such as to obtain Web pages or other electronic information from those target sites 130 (e.g., Web pages from a retailer target site 130 about particular product/service items that are available for purchase or other acquisition via the retailer target site 130). As discussed in greater detail elsewhere, the information provided to the users 150 from the retailer target sites 130 may include content items selected by the service 105, and may further include restricted access functionality that is not available to the users 140. For example, after it is determined that a user to whom a target site 130 is providing information is an authorized user 150 (e.g., by the CIS service 105 determining the identity of that user based on interactions of that user with user-selectable controls provided by the CIS service for display via one or more Web pages of the target site 130), the CIS service may perform actions to determine a level or type of access of that authorized user 150 to restricted access information in the current context (e.g., to enable an authorized user associated with a first target site 130 to obtain certain types of restricted access functionality while interacting with the first target site 130, but to optionally not receive some or all such restricted access functionality while interacting with other target sites), and then provide at least some of that restricted access functionality to that authorized user via that target site in that context. In some embodiments and situations, access of an authorized user to at least some types of restricted access functionality via a target site 130 may redirect that authorized user to engage in various subsequent interactions directly with the CIS service 105, and optionally to return to the prior interactions with the target site 130 after those restriction functionality access interactions are completed.

The described techniques may be used in a variety of situations and to provide a variety of benefits. For illustrative purposes, some embodiments are described below in which specific types of restricted access functionality to enable specific types of user analysis and control of content item selection are provided to specific types of users in specific types of manners, and/or in which specific types of content item selections occur and are used in specific manners to provide users with specific types of information for specific types of products in specific types of situations. These examples are provided for illustrative purposes and are simplified for the sake of brevity, and the inventive techniques may be used in a wide variety of other situations, some of which are discussed below, with the techniques not being limited to use with particular types of products or more generally with particular types of items, to particular types of user interfaces or other mechanisms for interacting with users or otherwise using selected content items, etc. For example, in some embodiments, the described techniques may be used to select entities (e.g., people, businesses or other organizations, etc.) or other things distinct from content items and products, may be used to select content items to be provided to entities other than users (e.g., organizations or other groups), etc.

FIGS. 2A-2E illustrate examples of dynamically selecting product-related content items to use in particular situations, and of enabling user analysis and control of selected content items. In particular, FIG. 2A illustrates an example of an item-specific Web page 200a that is provided by an example online retailer RRR, such as for display to a particular user (not shown). FIGS. 2B-2D illustrate examples of possible modifications to the Web page 200a in conjunction with the described techniques, and FIG. 2E illustrates additional restricted access functionality that may be provided to an authorized user (e.g., separately from example Web page 200a). FIGS. 4A-4E illustrate further additional restricted access functionality that may be provided to an authorized user in certain situations, as discussed in greater detail below.

With respect to FIG. 2A, the example Web page 200a is specific to a particular example product item ABC that is associated with an example brand LLL from an example manufacturer SSS, and is provided to a user (not shown) for display. The example Web page 200a includes various information 205 about the example product item ABC, and various user-selectable item ordering controls 210 with which the user may interact to initiate the purchase or other acquisition of product item ABC from the online retailer RRR. In this example, the Web page 200a also includes sections 215a and 225a that have information about various targeted product recommendations based at least in part on the current product item ABC, such as for potential selection and purchase by the user. For example, the product recommendations section 215a in this example corresponds to other items that are related to the current item based on prior purchase actions of users who purchased both the current item and the recommended other items, and includes four content items 216a-219a that are advertisements for four such other items. In addition, the product recommendations section 225a in this example corresponds to top-selling items in the same product category of the current item, and includes four content items 226a-229a that are advertisements for four such other items. For example, the four such other items with which the four content items 226a-229a are associated may be a first group of the four highest top-seller items in the category. The product recommendations from sections 215a and/or 225a may be obtained in various manners in various embodiments, such as to be determined by the online retailer RRR and/or supplied by an embodiment of the CIS service (not shown), optionally in conjunction with one or more external product recommendation services.

FIG. 2B illustrates an alternative Web page 200b that is similar to that of Web page 200a of FIG. 2A, but in which an example embodiment of the CIS service (not shown) uses the described techniques to provide restricted access functionality to an authorized user. In particular, in the example of FIG. 2B, the current user is an authorized user (e.g., a user representative of retailer RRR) who has previously established his or her identity (e.g., by performing login activities), and accordingly receives additional restricted access functionality from an embodiment of the CIS service based on additional information and controls that are provided. In other embodiments, some or all of the additional information and controls that are illustrated in FIG. 2B may instead be displayed to all users, such as to enable authorized users to use those controls to establish their identity and to subsequently receive additional corresponding restricted access functionality.

In this example of FIG. 2B, the CIS service makes one or more changes relative to the example of FIG. 2A to enable the restricted access functionality when supplying the content items of sections 215b and 225b, based at least in part on the current user being an authorized user. For example, the CIS service may enable the restricted access functionality by modifying one or more of the displayed content items to provide one or more restricted access user-selected controls via which the user may interact with the restricted access functionality, such as in addition to the other promotional material content of that content item. Content item 219b provides an example of such a modified content item that has been changed with respect to content item 219a of FIG. 2A, with content item 219b including a visual representation 230b (e.g., a logo of the CIS service) with which the user may interact to obtain restricted access functionality, as discussed in greater detail with respect to FIGS. 2C-2E and FIGS. 4A-4E. It will be appreciated that the visual representation of a content item may be modified in other manners in other embodiments, and that in some embodiments the restricted access functionality may be provided without modifying the visual representation of the displayed content items. In addition, while the visual representation 230b is illustrated with respect to only one of the content items of section 215b in this example, in other embodiments some or all of the other content items will also be modified in the same or a similar manner.

The CIS service may also enable the restricted access functionality in some embodiments and situations by replacing one or more displayed content items with a specified restricted access functionality content item, whether instead of or in addition to modifying one or more displayed content items. Content item 229b provides an example of such a replaced content item to provided restricted access functionality, in place of content item 229a of FIG. 2A, with content item 229b including a visual representation 230a in this example. The visual representation 230a may, for example, be similar to the visual representation 230b, or may further include various restricted access information (e.g., summary information about why one or more of the other displayed content items have currently been selected, summary information about historical effectiveness of displayed content items on this Web page, summary information about an account of the retailer RRR with the CIS service, etc., such as is discussed in greater detail with respect to FIGS. 4A-4E), and may optionally enable the user to obtain additional restricted access information and/or user-selectable controls if the user interacts with the visual representation 230a in a manner similar to that of visual representation 230b.

FIG. 2C illustrates an alternative Web page 200c that is similar to that of Web page 200b of FIG. 2B, but in which additional information and user-selectable controls 235a are displayed to the user. In particular, the example of FIG. 2C corresponds to a point in time immediately after the user has interacted with the visual representation 230b of content item 219b to obtain additional restricted access functionality. In this example, the additional information and controls 235a are displayed with a visual representation that is distinct from that of other parts of the Web page 200c, such as part of a pop-up window that is displayed partially over the various displayed content items, although in other embodiments may be displayed or otherwise provided in other manners. In addition, some or all of the additional information and controls 235a may be specific to content item 219b from which the visual representation 230b was selected (such that performing a similar selection of visual representation 230c of content item 216a may present different additional information and controls that are at least partially specific to content item 216a), although in other embodiments and situations the additional information and controls 235a may not be specific to content item 219b.

The additional information and controls 235a in the example of FIG. 2C are specific to a defined campaign of the CIS service with which content item 219b is associated, so as to display various information related to the campaign and to why this content item was selected for display on this Web page. In some embodiments, some or all such information may be available only to the client of the CIS service who defined the campaign (e.g., controls that provide the ability to modify the campaign). In this example, the additional information and controls 235a include a title 240a to provide context about the following information, a logo 230d corresponding to the CIS service, and various additional information corresponding to the campaign. The additional campaign-related information includes, for example, information 245a about time periods during which the campaign is effective, as well as a user-selectable control 245b with which those time periods may be changed. In addition, other of the additional campaign-related information in this example includes indications of geographic regions of users to which the content item is to be displayed, contextual information about product/service items with which this content item should be displayed (in this example, either items from Brand LLL of a particular item type or any items from Brand NNN, along with customers having one or more specified attributes, such as particular spending habits and/or demographic information), information about how often the content item is to be displayed for the campaign, and a ranking of the content item 219b with respect to the relevance measure of "Customers Who Bought This Item Also Bought The Following" for section 215b (in this example, a ranking of 7th). Thus, the illustrated information indicates that the content item 219b was selected in part because the current Web page is for a product item that matches the campaign criteria (La, is an item from Brand LLL that is of the specified type), and the content item 219b is associated with a product item EFG that is reasonably relevant for the corresponding relevance measure (i.e., is not among the top four corresponding to the four content item display slots, but is among the next four product items)—accordingly, the selection of the content item 219b for the product item EFG may further be based at least in part in this example on additional campaign-related incentives (e.g., fees paid by the client who defined the campaign to promote the display of the content item). While not illustrated here, in some embodiments additional details may be displayed regarding why this content item was selected for current display (e.g., to indicate why this content item was selected over other content items having higher assessed relevance with respect to one or more product recommendation strategies), such as is in a manner discussed in greater detail with respect to example FIGS. 4A-4E, and/or regarding other types of information (e.g., one or more fees paid by the client to promote this content item). In addition, additional types of functionality may be selectable in some embodiments beyond the displayed information, such as based on user interactions with the logo 230d and/or with one or more other controls that are not displayed here, including in a manner discussed in greater detail with respect to example FIGS. 4A-4E.

FIG. 2D illustrates an alternative Web page 200d that is similar to that of Web page 200c of FIG. 2C, but in which additional restricted access functionality is provided to the user that corresponds to historical and future display and use of selected content items on the Web site of retailer RRR. In the example of FIG. 2D, the additional restricted access functionality may, for example, be provided in response to prior selection by the user of the visual representation 230b of content item 219b. In particular, additional information and user-selectable controls 235b are displayed to the user in this example, in contrast to the information 235a of FIG. 2C. The additional information and controls 235b are displayed in this example with a visual representation similar to that of information 235a of FIG. 2C, such as to be part of a pop-up window, although in other embodiments may be displayed or otherwise provided in other manners. In addition, while additional informational control 255a in this example is specific to content item 219b from which the visual representation 230b was selected to initiate the display, various other of the additional information and controls 235b are not specific to that displayed content item—accordingly, performing a similar selection of the visual representation 230c of content item 216a may present information and controls that are mostly the same as the displayed additional information in this example.

At least some of the additional information and controls 235b in example FIG. 2D that correspond to historical and future display and use of selected content items on the Web site of retailer RRR may, for example, be available only to users who are representatives of retailer RRR, so as to enable retailer RRR to determine why this content item was selected for display on this Web page and/or to alter future display of content items on this page and/or on other pages from retailer RRR. The additional information and controls 235b in this example include a title 250a to provide context about the following information, a logo 230d corresponding to the CIS service, and various additional information 255a-265a corresponding to interactions between the CIS service and the retailer RRR. For example, the additional information includes the following in this example: informational control 255a to enable the user to select to obtain information about why content item 219b is currently selected for use in this particular situation; informational controls 260a to enable the user to select to obtain information about the effectiveness of content items being displayed on various parts of the retailer RRR's site (e.g., information about click-through rates and conversion rates of consumer users, corresponding gross and/or net revenue corresponding to such actions, etc.), such as for the current content item on one or more Web pages, any content items of the current Web page, any content items for Web pages of the product/service item category to which the product item ABC of the current Web page corresponds; and informational controls 265a to enable the user to select to alter or otherwise influence content items to be selected in the future for one or more Web pages of the retailer. While not illustrated here, in some embodiments additional types of functionality may be selectable beyond the displayed information, such as based on user interactions with the logo 230d and/or with one or more other controls that are not displayed here.

FIG. 2E illustrates various information 200e that is displayed to a user to enable the user to further specify a variety of types of controls related to the future selection of content items for retailer RRR's Web site. The display of the information 200e may be initiated in various manners, such as if the user previously selected the informational control 265a of FIG. 2D (e.g., by moving a selection point over the displayed control 265a, such as with a mouse, a figure on a touch-sensitive screen, or other pointer), as illustrated by selection box 270a of FIG. 2D. If so, the information 200e of FIG. 2E may be displayed in response. The information 200e may further be displayed in various manners in various embodiments, such as part of a new Web page that is generated and sent to a computing device of the user by the CIS service, as part of the same Web page 200d displayed in FIG. 2D (e.g., based on new information that is generated and sent to the user's computing device for display as part of another pop-up window or in another manner, based on previously supplied information that was provided by the CIS service along with the additional information and controls 235b but not initially displayed, etc.). In situations in which the user performs a series of one or more interactions with the CIS service separately from retailer RRR's Web site (e.g., via a separate Web site of the CIS service), the user may be returned to his/her original location and context at retailer RRR's Web site (e.g., to the Web pages displayed in FIG. 2A or 2B) in at least some embodiments.

The example information and controls of FIG. 2E enable the user to specify various types of filters or other restrictions 275a by which content items will be selected in the future by the CIS service for use on retailer RRR's Web site, as well as other controls 275b-275d to enable the user to access other types of functionality and controls. In particular, in this example, the restrictions 275a include controls 280a to specify parts of retailer RRR's Web site to which the restrictions will apply, and controls 280b to specify types of content items for the CIS service to select for those specified parts of retailer RRR's Web site. In this example, the user has selected control 285a to specify that the restrictions apply to the Web page displayed in FIGS. 2A-2D for product/service item ABC, and has selected control 285b to specify that the content items for that specified Web page are to be filtered by category of product/service items. In response to such selections, additional information (not shown) may be displayed to the user to enable the user to specify one or more particular product/service item categories from which content items may be selected for display on the specified Web page and/or to specify one or more particular product/service item categories from which content items may not be selected for display on the specified Web page. By selecting other of the controls 280a and 280b, the user may specify related restrictions for other Web pages and/or for particular recommendation display locations on Web pages (e.g., for display location section 215a rather than 215b of FIG. 2A), including with respect to restrictions on particular product/service items for which content items may be selected or not selected and/or with respect to various attributes of such product/service items or related content items. While not illustrated here, various other types of restrictions may further be specified, such as to target particular types of content items to particular customer users of the retailer RRR's Web site. In addition, the other controls 275b-275d in this example enable the user to access other functionality and controls related to historical sales reports for retailer RRR based on prior display of selected content items, various additional drilldown details related to prior or current selection of content items, and information about an account of the affiliated retailer RRR user with the CIS service, and various other types of functionality and controls may be provided in other embodiments.

FIGS. 4A-4E illustrate an example Web page 400 that continues the examples previously discussed with respect to FIG. 2B (with each of the FIGS. 4A-4E illustrating a subset of that example Web page 400), such as to illustrate further additional restricted access functionality that may be provided to an authorized user in certain situations. In the example Web page 400 of FIGS. 4A-4E, the generalized example Product Item ABC of FIG. 2B is shown as a specific example item (i.e., a "Charger Set XYZ for Apple iPhone/iPod" item) that is available from an example retailer target site (e.g., a Web site of the example Retailer RRR discussed with respect to FIGS. 2A-2E). The display of the example Web page 400 may, for example, be based on a selection or other interaction by the user with one or more restricted access functionality controls (e.g., the visual representation 230a of content item 229b, the logo 230d of FIG. 2C or 2D, the control 275c of FIG. 2E, etc.) to obtain additional restricted access functionality that corresponds to the selection of some or all of the content items in sections 215b and/or 225b of FIG. 2B. For example, the information on Web page 400 may provide information to enable the user to answer the question(s) of, with respect to one or more of the selected content items, what are the alternatives that the CIS system considered and how did it arrive at this specific conclusion? In the example of FIGS. 4A-4E, the Web page 400 may, for example, be part of a new Web page provided to the user after the user interaction that initiated the display of the new Web page, although in other embodiments such information may be displayed in other manners.

With respect to FIG. 4A, it displays a portion 400a of the example Web page 400, which includes various target item information 410a about the example specific item for which one or more content items may be selected for display. For example, some or all of the target item information 410a may include attributes of the example specific item and/or other information that the CIS system uses in identifying potentially relevant content items to be selected for display.

FIG. 4B displays a portion 400b of the example Web page 400 that also includes various target item information 410b about the example specific item, in a manner similar to that of FIG. 4A, and also displays various other item selection information 415b that is specific to various other items that are considered for selection in conjunction with the example specific item. For example, for one or more such selected other items, one or more associated content items for the selected other item may be displayed on the Web page along with information about the example specific item, such as in a manner similar to that discussed with respect to FIG. 2B. In this example, the other item selection information 415b includes various controls at the top of the section, which in this example are illustrated as user-selectable tab controls, and other information about other possible items that are considered for selection. The various tab controls may provide a variety of types of information and functionality to the user in various situations, such as from the following non-exclusive list: to illustrate the relationship between the example specific item and a particular candidate other item (e.g., based on prior interactions by other users with the example specific item and particular candidate other item, such as to reflect a Conditional Probability ("CP") that a user who clicks and/or purchases the example specific item will also click and/or purchase the particular candidate other item); to illustrate a business value of selecting a particular candidate other item for the example specific item (e.g., an Expected Value ("EV") from selecting the particular candidate other item from the example specific item, such as a monetary value from other users clicking and/or purchasing the particular candidate other item when an associated content item is displayed along with the specific example item); etc. It will be appreciated that user-selectable controls and information may be displayed and accessed in other manners in other embodiments.

FIGS. 4C-4E illustrate additional information in a manner similar to that of FIG. 4B, with the FIGS. 4C-4E displaying additional portions 400c-400e, respectively, of the example Web page 400. The information displayed in FIGS. 4C-4E in this example includes additional item selection information regarding particular other items that are candidates for selection for this example specific item.

By enabling the user to access information and controls from particular parts of retailer RRR's Web site, the user may be enabled to more efficiently access and control desired information, such as based at least in part on a current context of the user when interacting with a particular part of retailer RRR's Web site. For example, as discussed elsewhere, the CIS service may additionally provide a separate GUI that the user may access by interacting directly with the CIS service to specify restrictions for various parts of retailer RRR's Web site and/or to determine information about the selection of particular content items in particular locations (e.g., information about why those selections were made, about the effectiveness of those content item selections, etc.). However, using such a general GUI, a user may need to make a number of selections and navigational actions to reach information that is specific to the Web page displayed in FIGS. 2A-2D and/or FIGS. 4A-4E for the particular product item ABC. Conversely, by providing the restricted access functionality described with respect to FIGS. 2B-2E and/or FIGS. 4A-4E, the user may identify a particular part of retailer RRR's Web site of interest, identify information about particular content items that are currently selected for display, and immediately access information and controls related to the current (and prior) content item selections for that location and to influence future related content item selections, thus providing a more intuitive interface, and in some embodiments and situations providing access to additional information and/or controls that may not be otherwise accessible.

It will be appreciated that various of the details illustrated in FIGS. 2A-2E and FIGS. 4A-4E are included for explanatory purposes, and that the inventive described techniques may be used in other manners and without the exemplary details.

FIG. 3 is a block diagram illustrating an example embodiment of a content item selection system for performing techniques to dynamically select particular content items that are recommended for presentation to users and for enabling user analysis and control of the content item selection and subsequent use. In particular, FIG. 3 illustrates a server computing system 300 suitable for executing an embodiment of a Content Item Selection ("CIS") system 340, as well as various user computing systems 350, target site computing systems 390, other optional computing systems 360 that optionally provide other services with which the CIS system interacts, and other optional computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352 (although particular components are not illustrated), storage 354, and memory 357. The other computing systems 360, 380 and 390 may also each include similar components to some or all of the components illustrated with respect to computing system 300, but such components are not illustrated in this example for the sake of brevity.

An embodiment of the CIS system 340 is executing in memory 330, such as under control of one or more CPU processors 305 as programmed or otherwise configured by executable software instructions of the system 340, and a CIS service provided by or otherwise managed by the CIS system 340 provides functionality related to some or all of the described techniques for providing restricted access functionality to authorized users. The system 340 may interact with computing systems 350, 360, 380 and 390 over the network 395 (e.g., via the Internet and/or the World Wide Web, via a private cellular network, etc.), and may select particular content items for presentation to users (not shown) in particular situations who are interacting with user computing systems 350. In addition, the CIS system 340 includes functionality related to enabling user analysis and control of the selection and subsequent use of particular content items in particular situations, such as for at least some users (not shown) who are interacting with user computing systems 350 and who are authorized to receive restricted access functionality in particular situations from the CIS service. The information from the CIS system may in some embodiments and situations be provided directly to the user computing systems 350, while in other embodiments the information may be provided indirectly by the CIS system via one or more target sites provided by the computing systems 390 to the users and/or via other services (e.g., optional other services 335, optional other services provided by the other service computing systems 360, etc.) that interact directly with the users, such as if the users are customers of the services and/or are clients or affiliates of the CIS service.

The other computing systems 350, 360, 380 and 390 may have various forms, and may be executing various software as part of interactions with the CIS system. For example, user computing systems 350 may include various types of client devices (e.g., a desktop computing system, a laptop or other portable computing system, a smartphone or other cell phone or other mobile device that includes appropriate communication and computing capabilities, etc.), and in the illustrated embodiment is shown executing a Web browser 358 or other software in memory 357 to interact with other computing systems (e.g., the target site computing systems) and/or the CIS system 340—while not illustrated here, such user computing systems 350 may also include another software module provided by the CIS system that is designed to enable the user to interact directly with the CIS system 340, such as another software module that is used instead of or in addition to the illustrated Web browser 358. The Web browser 358 or other software on a user computing system 350 may, for example, obtain and display Web pages or other information from target site computing systems 390—in addition, the display of that information may initiate one or more requests by the Web browser 358 to the CIS system 340 to obtain information about content items selected by a Selection Manager module 344 of the system 340, and may display or otherwise present some or all of that obtained information (e.g., via a GUI of the CIS system that is displayed to the user via one or more Web pages or other UI screens on the user computing system 350) to enable the user to interact with or otherwise use that information in various manners (e.g., to obtain additional information about associated product/service items, to initiate purchases or other acquisitions of such associated product/service items, etc.).

If a user is authorized to obtain particular restricted access functionality in a particular situation, the displayed Web pages or other information from one or more target site computing systems 390 may provide such restricted access functionality to such authorized users. The provision of the restricted access functionality may be based on interactions of an Authorized User Interaction Manager module 348 of the system 340 that enables the user to analyze and/or control content item selection based on that restricted access functionality, such as by providing such authorized users with access to functionality provided by a Client/Affiliate Interaction Manager module 346 of the system 340. Such actions of the Authorized User Interaction Manager module 348 may include, for example, providing one or more content items as part of Web pages provided to such users by target site computing systems 390, with those provided content items including restricted access functionality to enable the authorized users to perform various analysis and control of product-related content items that are selected for display to users in particular situations (e.g., with those provided content items enabling the authorized users to interact with the Client/Affiliate Interaction Manager module 346 via the Web pages provided by the target site computing systems 390). In addition, one or more users of the user computing systems 350 may further interact with CIS system 340 to perform various other types of actions, such as to interact with the Client/Affiliate Interaction Manager module 346 of the system 340 to define and monitor content item visibility campaigns of clients, as discussed in greater detail elsewhere. The modules 346 and/or 348 may use and/or store various authorized user information 324 and client campaign information 326 on storage 320 as part of their operation.

While not illustrated, software executing on one or more of the target site computing systems 390 may similarly interact with the CIS system 340 (e.g., with a Target Site Interaction Manager module 342 of the system 340) to obtain information about content items selected by the Selection Manager module 344 of the system 340, and may include some or all of that obtained information as part of Web pages provided to users for display, whether instead of or in addition to interactions by the user computing systems 350 with the CIS system 340.

In addition, as described in greater detail elsewhere, the CIS system 340 may in some embodiments be integrated with or otherwise affiliated with one or more other services (e.g., online retailers or other retailers, item review services, databases or other services that provide information about items and/or about user interactions with items, etc.), and if so may interact with those other services in various manners. If so, one or more such other services may, for example, execute on computing system 300 as other services 335 in memory 330, as one or more other services (not shown) that each execute on one or more of the target site computing systems 390, and/or as one or more services (not shown) that each execute on one or more of the other remote service computing systems 360. The interactions with the other services may include, for example, some or all of the following non-exclusive list: obtaining information about products and other items available from those services or otherwise about which the service has access to information, such as product information 367 on target site computing system 390 and/or similar product information (not shown) on other service computing system 360; obtaining information about various types of prior interactions of customers and other users with the other services or otherwise about which the other services have access to information (e.g., to view information about items; to purchase items; to provide other types of feedback about particular items or relationships between items, such as that a particular item is regarded in a particular positive or negative manner, or that two or more items are similar to each other or are otherwise related in one or more manners; etc.), such as optional user interaction information 369 on target site computing system 390 and/or similar user interaction information (not shown) on other service computing system 360; etc. The CIS system may obtain such information in various manners, such as by the CIS system pulling such information from one or more other services periodically and/or on demand, by one or more other services pushing such information to the CIS system periodically and/or as otherwise triggered (e.g., as soon as the information is available, such as to maintain a live feed so that the CIS system has access to the most up-to-date available information), etc. After such information is obtained by the CIS system, the CIS system may then store such information for later use (e.g., in databases 328 on storage 320, or on one or more remote other computing systems 380), or in other embodiments may instead retrieve the information as needed and not maintain a local copy of the information. Various other information related to the operation of the CIS system 340 may also be stored in storage 320 or elsewhere (e.g., information about particular content items that are available for display, such as in conjunction with product/service items associated with the content items; information about clients of the CIS system, such as preference information; information about defined campaigns of clients of the CIS system; etc.), including in the illustrated databases 322 and 326, or instead in other databases (not shown).

The CIS system 340 may use the various available information in various manners, including to select content items for particular situations. For example, the Selection Manager system 344 may determine any defined campaigns that correspond to a particular situation, identify any content items associated with those determined campaigns for the particular situation, and determine whether to select one or more such identified content items for use in various manners (e.g., based on criteria defined for those determined campaigns; based on those content items being sufficiently relevant for the particular situation, such as based on a related product/service item being sufficiently highly recommended, such as based on one or more targeted recommendation strategies and/or non-targeted recommendation strategies; based on performing a costs-benefits analysis of use of a particular content item in a particular manner in the particular situations; etc.). In addition, the CIS system 340 may provide information about selected content items for particular situations in various manners and at various times, such as after the CIS system 340 receives requests (or other indications) to provide such information from target sites, other services and/or users. The information content item selection information provided by the CIS system 340 may in some embodiments and situations be dynamically generated by the CIS system 340 in response to a request, while in other embodiments and situations may be dynamically retrieved by the CIS system 340 from previously determined and stored information.

While not illustrated here, the CIS system may further have other modules or associated functionality in other embodiments, such as to generate user interaction information (e.g., based on monitoring users' interactions with retailers or other services; based on retrieving and processing information from retailers or other services related to such interactions, such as to identify data to be used with particular content item selection strategies; etc.). Additional details related to various operations of embodiments of the CIS system and an associated CIS service are included elsewhere.

It will be appreciated that computing systems 300, 350, 360, 380 and 390 are merely illustrative and are not intended to limit the scope of the present invention. The computing systems/devices may instead each include multiple interacting computing systems or devices, and the computing systems/devices may be connected to other devices that are not illustrated, including through one or more networks such as the Internet, via the Web, or via private networks (e.g., mobile communication networks, etc.). More generally, a computing device or other computing system may comprise any combination of hardware or software that may interact and perform the described types of functionality, including without limitation, desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CIS system 340 may in some embodiments be distributed in additional modules or combined in fewer modules. Similarly, in some embodiments some of the functionality of the CIS system 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 6:
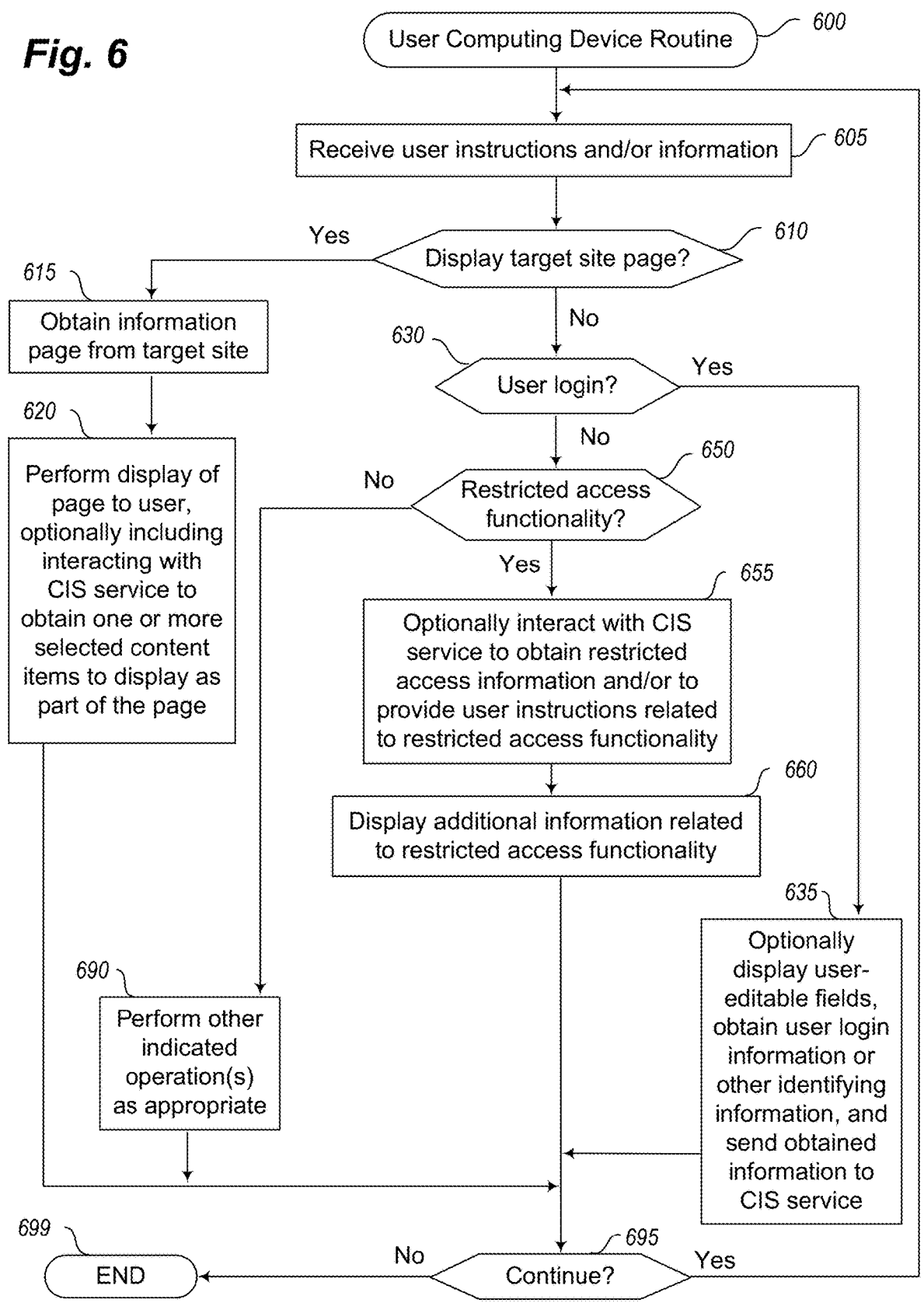
FIG. 6 is a flow chart of an example embodiment of a User Computing Device routine.

FIG. 6 is a flow chart of an example embodiment of a User Computing Device routine 600, such as to provide a high-level overview of a user who obtains access to functionality of an example embodiment of the content item selection service. The routine 600 may be performed, for example, by a browser 358 or other software executing on a user computing system 350 of FIG. 3 and/or by software executing on a computing device or system of a user 140 of FIG. 1, such as to interact with an embodiment of a content item selection service to obtain access to at least some of the functionality described with respect to the examples of FIGS. 2B-2E and FIGS. 4A-4E, and more generally to obtain access to functionality provided by some or all of the techniques described herein for providing restricted access functionality to users.

The routine 600 begins at block 605 in the illustrated embodiment, where one or more user instructions and/or types of information are received. The routine then continues to block 610 to determine whether a user request has been received to display or otherwise present a particular information page from a target site to a user of the computing device, such as a Web page or other type of information page. Such other types of information pages may have various forms in various embodiments, such as an email electronic communication formatted using HTML (HyperText Markup Language), or a page of information that is not based on HTML (e.g., a Web page specified using another markup language or data format, an email specified using another format, a Multimedia Messaging Service message or similar communication, a multimedia-based chat or instant message communication, etc.).

If it is determined in block 610 that a user request has been received to display or otherwise present a particular information page, the routine continues to block 615 where the information page is obtained from the target site, whether by interactively requesting and receiving the information page (e.g., by making a request to a Web server of the target site for a Web page), or by retrieving a previously received information page (e.g., by accessing a mail server to obtain a received HTML-based email page). After block 615, the routine continues to block 620 to perform a display of the information page to the user, such as on the computing device or on an associated display device. As discussed in greater detail elsewhere, in some embodiments the display of the information page may automatically initiate one or more requests to an embodiment of the CIS service to obtain one or more content items that are selected by the CIS service for display to the user as part of the information page or otherwise in association with the information page, and if so such requests are made in block 620 and the display of the resulting selected content item(s) is initiated in block 620. In other embodiments and situations, a particular information page may already have one or more such selected content items (e.g., if the target site obtains the selected content items and provides them together with the information page), or may be displayed without any such selected content items. In addition, as discussed in greater detail with respect to blocks 630-660, if the user has previously provided information to the CIS service that identifies the user as being authorized, such as based on interactions with other previously displayed information pages, the information page displayed to the user in block 620 may further include various restricted access information and/or restricted access user-selectable controls that are not provided to other users who are not authorized, such as based in part or in whole on one or more selected content items provided by the CIS service.

If it is instead determined in block 610 that a user request to display or otherwise present a particular information page has not been received, the routine continues to block 630 to determine whether a user request or other interaction has been performed to provide login information or other identifying information to the CIS service, and if so continues to block 635. Such a user request or other interaction may, for example, involve the user clicking on or otherwise interacting with a user-selectable control in a Web page or other information page that was previously displayed to the user (e.g., in block 620). For example, in at least some embodiments, one or more selected content items provided by the CIS service may enable the user to access the ability to provide login information (e.g., in a manner that is visible to any user, by accessing hidden or otherwise non-visible functionality that may be known to only authorized users, etc.). In block 635, the routine optionally displays (if not already visible) user-editable fields or other user-selectable controls that allows the user to specify login information or other identifying information, obtains the user-identifying information, and sends the obtained information to the CIS service to initiate a login process for the user if appropriate. In some embodiments, the providing of such identifying information may further include, if the user is determined to be authorized, modifying a currently displayed information page to enable access of the user to restricted access functionality that corresponds to a level or type of the user's authorization, although in the illustrated embodiment such access is instead enabled with respect to blocks 620 and/or 655-660. The obtaining of the user-identifying information may include, for example, receiving login information (e.g., a username and password) that is typed or otherwise input by the user, or in some embodiments and situations may include automatically retrieving user-specific information (e.g., information that is stored on the user computing device, such as a browser cookie previously stored by the CIS service and/or a particular target site, sign-on information for one or more particular target sites, sign-on information for a single sign-on service that is separate from but used by the CIS service, etc.).

If it is instead determined in block 630 that a user request or other interaction to provide login information or other identifying information to the CIS service has not been received, the routine continues to block 650 to determine whether a user request or other interaction has been performed to initiate access to restricted access functionality from the CIS service, and if so continues to block 655. Such a user request or other interaction may, for example, involve the user clicking on or otherwise interacting with a user-selectable control in a Web page or other information page that was previously displayed to the user (e.g., in block 620). For example, in at least some embodiments, one or more selected content items provided by the CIS service may enable the user to access the ability to request restricted access information and/or to obtain access to restricted access user-selectable controls (e.g., by accessing hidden or otherwise non-visible functionality that may be known to only authorized users, in a manner that is visible to any user but approved or otherwise enabled only for authorized users, etc.). In block 655, if the requested restricted access functionality is not already available, the routine optionally interacts with the CIS service to obtain restricted access information and/or restricted access user-selectable controls to display or otherwise provide to the user. If the request or other interaction in block 605 involved the user providing information and/or instructions by interacting with a restricted access user-selectable control that was already available to the user, the routine in block 655 may further submit to the CIS service the information and/or instructions provided by the user. After block 655, the routine continues to block 660 to display additional information to the user related to the restricted access functionality, such as additional restricted access information and/or restricted access user-selectable controls that are received from the CIS service as part of or in response to interactions of block 655, or instead additional restricted access information and/or restricted access user-selectable controls that were previously available to the user computing device but not displayed or otherwise made available to the user. When displaying additional information and/or user-selectable controls in blocks 635 and/or 660, the routine may in some embodiments and situations display a new Web page or other information page, while in other embodiments, one or more of various types of client-side functionality may be used to modify the previously displayed Web page or other information page to newly enable access to such restricted access functionality.

If it is instead determined in block 650 that the instructions/information received in block 605 are not a request or other interaction to obtain access to restricted access functionality, the routine continues to block 690 to optionally perform one or more other indicated operations as appropriate. Such other operations may include, for example, receiving and storing information for later use (e.g., information about restricted access functionality that has not yet been provided to the user; information about particular content items for later display to the user; etc.); performing interactions with the CIS service to enable a user representative of a client to access information or functionality (e.g., an account of the client) available from the CIS service for the client, such as to interact with a client/affiliate interaction manager module of the content item selection system (e.g., the Client/Affiliate Interaction Manager module 346 of FIG. 3); performing interactions with the CIS service to enable a user representative of a target site to access information or functionality available from the CIS service for the target site, such as to interact with a target site interaction manager module of the content item selection system (e.g., the Target Site Interaction Manager module 342 of FIG. 3); performing periodic housekeeping operations, etc.

After blocks 620, 635, 660 or 690, the routine continues to block 695 and determines whether to continue, such as until an explicit termination indication is received. If it is determined to continue, the routine returns to block 605, and otherwise continues to block 699 and ends.

As discussed in greater detail elsewhere, the ability of a user to access restricted access functionality from the CIS service may be in addition to (e.g., as an alternative to) another user interface provided by the CIS service to the user. For example, when obtaining restricted access functionality based on interactions of a user with a Web page or other information page of a target site, the restricted access functionality that is provided may be based at least in part on the context of the user at that target site (e.g., on particular information that the user selects or otherwise indicates on that Web page or other information page, or that is otherwise displayed on that information page). Alternatively, in at least some embodiments and situations, a separate user interface provided by the CIS service to authorized users may include some or all of the same functionality available to authorized users via routine 600 (and optionally may include additional functionality that is not available via routine 600), but in a manner that is not specific to the context of a particular Web page or other information page or to the context of a particular target site.

Those skilled in the art will also appreciate that in some embodiments the various described systems and modules may each perform functionality that may be expressed in one or more routines, such as to perform various steps or operations in various manners (e.g., in serial or in parallel, in a synchronous or asynchronous manner, in a particular order, etc.), including as is discussed above. It will also be appreciated that in some embodiments the functionality provided by the routine discussed above may be provided in alternative ways, such as being split among more routines. Similarly, in some embodiments the illustrated routine may provide more or less functionality than is described. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects have been discussed in specific terms such as to be described as processes and/or systems and/or may be presented at times in certain claim forms, the inventors contemplate the various aspects of the invention in any available claim form, including methods, systems, computer-readable mediums on which are stored executable instructions or other contents to cause a method to be performed and/or on which are stored one or more data structures to enable performance of such a method, etc.

What is claimed is:

1. A computer-implemented method, comprising:
   receiving instructions from an online retailer to supply advertisement content as part of multiple Web pages provided by the online retailer to multiple users, the receiving of the instructions being performed by a configured computer system of a content item selection service distinct from the online retailer, the received instructions including information about a first portion of each of the multiple Web pages that includes product information provided by the online retailer and including information about a distinct second recommendations portion of each of the multiple Web pages that is available for displaying advertisement content pieces to be selected by the content item selection service;
   after the receiving of the instructions, receiving a request for advertisement content to be displayed to an indicated user of the online retailer as part of the second recommendations portion of an indicated one of the multiple Web pages, the first portion of the indicated one Web page including information about an indicated product available for purchase from the online retailer, the receiving of the request being performed by the configured computer system;
   automatically determining that the indicated user is authorized to obtain access to restricted functionality from the content item selection service that is related to selection of advertisement content for the online retailer, the automatic determining being performed by the configured computer system and being based at least in part on obtained information specific to the indicated user, the restricted functionality not being available to other of the multiple users of the online retailer who are not authorized;
   automatically selecting a group of one or more pieces of advertisement content to be displayed to the indicated user as part of the second recommendations portion of the indicated one Web page, the one or more advertisement content pieces of the selected group providing recommendations of one or more other products distinct from the indicated product, the automatic selecting being performed by the configured computer system;
   in response to the automatic determining that the indicated user is authorized, automatically modifying the selected group to include one or more user-selectable controls to be displayed to the indicated user as part of the second recommendations portion of the indicated one Web page, the one or more user-selectable controls providing the access to the restricted functionality, the automatically modifying of the selected group being performed by the configured computer system; and
   after display of the modified selected group to the indicated user as part of the second recommendations portion of the indicated one Web page,
      receiving information about a selection by the indicated user of at least one of the one or more user-selectable controls of the displayed modified selected group; and
      in response to the selection by the user of the at least one user-selectable control, providing the access to the restricted functionality to the indicated user, the providing of the access being performed by the configured computing system and including displaying additional restricted information to the indicated user as part of the indicated one Web page, the additional restricted information not being displayed as part of the indicated one Web page to the other users who are not authorized.

2. The method of claim 1 wherein the automatic modifying of the selected group to include the one or more user-selectable controls includes at least one of replacing a piece of advertisement content in the selected group with the one or more user-selectable controls.

3. The method of claim 2 wherein the automatic determining that the indicated user is authorized to obtain the access to the restricted functionality includes using obtained login information that is supplied by the indicated user for the content item selection service based on interactions of the indicated user with another of the multiple Web pages that was previously provided to the indicated user from the online retailer, the another Web page including a user-selectable login control added by the configured computer system.

4. The method of claim 2 wherein the selection by the user of the at least one user-selectable control provides instructions to the content item selection service regarding control of future selection of advertisement content for Web pages of the online retailer, and wherein the method further comprises performing the future selection of advertisement content for Web pages of the online retailer in accordance with the instructions.

5. The method of claim 1 further comprising:
under control of the configured computer system, initiating the display to the indicated user of the modified selected group as part of the second recommendations portion of the indicated one Web page, the initiating of the display including sending one or more electronic communications that include information about the modified selected group; and
under control of a client computing device of the indicated user:
receiving the indicated one Web page from a configured computer system of the online retailer, and receiving the information included in the sent one or more electronic communications; and
displaying the indicated one Web page on the client computing device, the displayed indicated one Web page including a display of the multiple advertisement content pieces of the modified selected group as part of the second recommendations portion of the displayed indicated one Web page.

6. A computer-implemented method, comprising:
receiving a request to provide promotional information as part of a first Web page from an online retailer to be displayed to a user, the first Web page including content other than the promotional information that is provided by the online retailer, the receiving of the request being performed by a configured computing system of a content item selection service distinct from the online retailer;
automatically selecting, by the configured computing system, one or more pieces of promotional content to include as part of the first Web page for use as recommendations to the user of one or more products;
determining, by the configured computing system, that the user is authorized to obtain access to restricted functionality of the content item selection service related to selection of promotional content for Web pages from the online retailer, wherein the restricted functionality is not available to other users who are not authorized and includes information about how the selecting of the one or more pieces of promotional content to include as part of the first Web page is performed by the content item selection service and further enables control by the user to modify how future selection of the one or more pieces of promotional content will be performed by the content item selection service;
providing, by the configured computing system and for display to the user as the promotional information that is part of the first Web page, the selected promotional content pieces and one or more user-selectable controls, wherein the user-selectable controls are selected to be provided as part of the first Web page to provide the user with the access to the restricted functionality in response to the determining that the user is authorized; and
in response to selection by the user of at least one of the one or more user-selectable controls displayed as part of the first Web page, providing to the user, by the configured computing system, the access to the restricted functionality, wherein the providing of the access includes initiating a display to the user of at least some of the information about how the selecting of the one or more pieces of promotional content for the first Web page is performed.

7. The method of claim 6 wherein the restricted functionality provided to the user is functionality that is provided by the content item selection service and that relates to a context of the first Web page.

8. The method of claim 7 further comprising providing to the user, by the configured computing system, a distinct user interface of the content item selection service that is separate from any Web pages of the online retailer, the provided user interface supplying access to restricted functionality of the content item selection service that is not specific to the context of the first Web page.

9. The method of claim 6 wherein the displayed at least some information about how the selecting of the one or more pieces of promotional content for the first Web page is performed includes at least one of information indicating why the one or more pieces of promotional content were selected or of information indicating why at least one other piece of promotional content was not selected.

10. The method of claim 6 wherein multiple copies of the first Web page were previously provided to multiple users and included multiple pieces of promotional content selected by the content item selection service, and wherein the restricted functionality provided to the user includes displaying information to the user that is based at least in part on the multiple pieces of promotional content.

11. The method of claim 6 wherein the restricted functionality provided to the user includes displaying information to the user related to historical promotional effectiveness of one or more pieces of promotional content selected for display on a group of one or more Web pages that includes the first Web page.

12. The method of claim 6 wherein the providing of the access further includes receiving specified instructions from the user related to controlling how the future selection of the one or more pieces of promotional content will be performed, and storing the specified instructions for later use in the controlling of how the future selection of the one or more pieces of promotional content is performed.

13. The method of claim 12 wherein the specified instructions include restricting future selection of the one or more pieces of promotional content for use with the first Web page.

14. The method of claim 6 wherein the control by the user to modify how future selection of the one or more pieces of promotional content will be performed includes enabling the user to specify instructions related to controlling future selection of promotional content pieces for a group of one or more Web pages that includes the first Web page, and wherein the providing of the access further includes receiving the specified instructions from the user and storing the specified instructions for later use in the controlling of the future selection of the promotional content pieces for the group of one or more Web pages.

15. The method of claim 6 wherein the determining that the user is authorized to obtain access to the restricted functionality includes determining that the user is a designated representative of the online retailer, and wherein the restricted functionality provided to the user enables the user to determine effectiveness of display of promotional content pieces on one or more Web pages from the online retailer and to control future selection of promotional content pieces for display on one or more Web pages from the online retailer.

16. The method of claim 6 wherein the determining that the user is authorized to obtain access to the restricted functionality includes determining that the user is a representative of a client of the content item selection service that is associated with at least one of the selected promotional content pieces, and wherein the restricted functionality provided to the user enables the user to perform at least one of determining effectiveness of display of the at least one selected promotional content pieces on one or more Web pages from one or more online retailers or of controlling future selection of the at least one selected promotional content pieces on one or more Web pages from one or more online retailers.

17. The method of claim 6 wherein the providing of the one or more user-selectable controls includes providing the one or more user-selectable controls in place of one or more other promotional content pieces.

18. The method of claim 6 wherein the providing of the one or more user-selectable controls includes modifying one or more of the provided selected promotional content pieces to each include a visual representation when displayed corresponding to the restricted functionality, each visual representation enabling the user to obtain access to at least one of the one or more user-selectable controls.

19. The method of claim 6 wherein the determining that the user is authorized includes verifying that identifying information obtained from the user matches other information for the user that is accessible to the content item selection service.

20. The method of claim 6 wherein the providing to the user of the access to the restricted functionality includes providing the restricted functionality to the user as part of one or more modifications made to the first Web page displayed to the user without loading a new Web page.

21. The method of claim 6 wherein the automatic selecting of the one or more pieces of promotional content is based on at least one of the user, or of an advertising campaign specified by a client that is distinct from the online retailer and from the user.

22. The method of claim 21 wherein the content of the Web page provided by the online retailer includes information about one or more target products distinct from the one or more products, and wherein the automatic selecting of the one or more pieces of promotional content is further based on the one or more target products and on information about prior interactions of the user with one or more online retailers that include the online retailer.

23. The method of claim 6 wherein the online retailer is one of multiple online sites that receive promotional materials from the content item selection service for display as part of Web pages provided by the multiple online sites, wherein the content item selection service is operated by an entity that is distinct from multiple operators of the multiple online sites, and wherein the selected one or more pieces of promotional content include multiple pieces of promotional content of one or more types, the one or more types including video information, text, images, and audio clips.

24. A non-transitory computer-readable medium having stored contents that configure a computing system of a selection service to automatically perform a method, the method comprising:
    receiving, by the configured computing system of the selection service, a request to provide promotional information to a user as part of a Web page from an online retailer to be displayed to the user, wherein the Web page includes information about one or more target products available to be acquired from the online retailer, and wherein the online retailer is distinct from an operator of the selection service;
    determining, by the configured computing system, that the user is authorized to obtain access to restricted functionality, wherein the restricted functionality includes information about how selection of promotional content is performed by the selection service for the online retailer and enables control by the user in modifying how future selection of the promotional content will be performed by the selection service and is not available to other users who are not authorized;
    automatically selecting, by the configured computing system, one or more pieces of content to include as part of the Web page when displayed to the user, wherein at least one of the selected content pieces includes promotional information about one or more other products distinct from the one or more target products, and wherein one or more of the selected content pieces include one or more user-selectable controls that provide the access to the restricted functionality and that are included in the selected pieces of content in response to the determining that the user is authorized; and
    sending, by the configured computing system, one or more electronic communications that have information about the selected pieces of content, wherein the sent one or more electronic communications enable display to the user of the selected pieces of content as part of the Web page, and wherein at least one of the selected pieces of content provides, when displayed to the user as part of the Web page, the user with the access to the restricted functionality as part of the Web page.

25. The non-transitory computer-readable medium of claim 24 wherein the method further comprises, after the sending of the one or more electronic communications:
    receiving an indication of a selection by the user of at least one of the one or more user-selectable controls on the displayed Web page; and
    in response to the selection by the user, providing the access to the restricted functionality to the user.

26. The non-transitory computer-readable medium of claim 24 wherein the sent one or more electronic communications include restricted access information for display to the user as part of the Web page, the restricted access information including the information about how the selection of promotional content is performed by the selection service for the online retailer and not being displayed as part of the Web page to other users who are not determined to be authorized.

27. The non-transitory computer-readable medium of claim 24 wherein the computer-readable medium is a memory of the configured computing system, and wherein the contents are instructions that when executed program the configured computing system to perform the method.

28. A computing system, comprising:

one or more processors; and a content item selection system that, when executed by at least one of the one or more processors, configures the at least one processor to automatically determine content items for presentation to a user, by:

receiving a request to provide content items for inclusion as part of an electronic information page from an online target site to be presented to the user, the electronic information page being formatted at least in part using HyperText Markup Language (HTML) and including information about one or more target products;

determining that the user is authorized to obtain access to restricted functionality from the content item selection system, wherein the restricted functionality is not available to other users who are not authorized and includes information about how selection of content items is performed and enables control by the user for modifying how future selection of the content items will be performed for a group of information pages that includes the electronic information page;

selecting content items to include as part of the electronic information page when presented to the user, wherein at least one of the selected content items include information about one or more other products distinct from the one or more target products, and wherein one or more of the selected content items include one or more user-selectable controls that provide the access to the restricted functionality and that are selected by the content item selection system in response to the determining that the user is authorized; and sending one or more electronic communications that include information about the selected content items, wherein the sent one or more electronic communications enable inclusion of the selected content items as part of the electronic information page when presented to the user, and wherein the selected one or more content items provides, when presented to the user as part of the electronic information page, the user with access to the one or more user-selectable controls.

29. The computing system of claim 28 wherein the user is a customer of an online retailer who has a Web site that is at least part of the online target site and who is distinct from an operator of the content item selection system, wherein the electronic information page is a Web page provided from the Web site, wherein the one or more target products whose information is included in the electronic information page are available for acquisition from the online retailer, and wherein the selected at least one content items includes promotional material for the one or more other products.

30. The computing system of claim 29 wherein the automatic determining of the content items for presentation further includes:

determining that a second users is not authorized to obtain the access to the restricted functionality from the content item selection system; and sending one or more additional electronic communications for the second user that include information about content items selected for inclusion as part of the electronic information page when presented to the second user, to provide information to the second user about at least one other product distinct from the one or more target products without enabling access of the second user to the restricted functionality from the content item selection system.

31. The computing system of claim 28 wherein the content item selection system is operated by an operator of the single-online target site.

32. The computing system of claim 28 wherein the electronic information page is an email communication sent to the user that is formatted using HTML.

33. The computing system of claim 28 wherein the content item selection system includes software instructions for execution by the at least one processors that configure the at least one processors to perform the automatic determining of the content items for presentation to each of multiple users.

34. The computing system of claim 28 wherein the content item selection system consists of one or more means for the automatic determining of the content items for presentation to the users.

35. The computing system of claim 28 wherein the selecting of the content items to include as part of the electronic information page includes selecting the one or more contents item in place of one or more other promotional content items.

36. The non-transitory computer-readable medium of claim 24 wherein the selecting of the one or more pieces of content to include as part of the Web page includes selecting the one or more pieces of content in place of one or more other promotional pieces of content to include as part of the Web page.

37. The non-transitory computer-readable medium of claim 24 wherein the displayed selected one or more pieces of content provides the user with access to the restricted functionality by including a visual representation that, when selected by the user, provides the restricted functionality.

* * * * *

UNITED STATES PATENT AND TRADEMARK OFFICE
CERTIFICATE OF CORRECTION

Page 1 of 2

PATENT NO. : 10,748,159 B1
APPLICATION NO. : 13/179365
DATED : August 18, 2020
INVENTOR(S) : David Lee Selinger et al.

It is certified that error appears in the above-identified patent and that said Letters Patent is hereby corrected as shown below:

In the Claims

Column 34, Line 65, Claim 2:
"user-selectable controls includes at least one of replacing a" should read --user-selectable controls includes replacing a--.

Column 38, Line 26, Claim 24:
"system, one or more pieces of content to include as part" should read --system, pieces of content to include as part--.

Column 38, Line 42, Claim 24:
"the Web page, and wherein at least one of the selected" should read --the Web page, and wherein the selected--.

Column 38, Line 43, Claim 24:
"pieces of content provides, when displayed to the user" should read --one or more pieces of content provide, when displayed to the user--.

Column 39, Line 41, Claim 28:
"more content items provides, when presented to the" should read --more content items provide, when presented to the--.

Column 40, Line 2, Claim 29:
"wherein the selected at least one content items includes" should read --wherein the selected at least one content item includes--.

Column 40, Line 7, Claim 30:
"determining that a second users is not authorized to obtain" should read --determining that a second user is not authorized to obtain--.

Signed and Sealed this
Twenty-second Day of September, 2020

Andrei Iancu
*Director of the United States Patent and Trademark Office*

CERTIFICATE OF CORRECTION (continued)
U.S. Pat. No. 10,748,159 B1

Column 40, Line 21, Claim 31:
"the single-online target site." should read --the online target site.--.

Column 40, Line 27, Claim 33:
"for execution by the at least one processors that configure the" should read --for execution by the at least one processor that configure the--.

Column 40, Line 28, Claim 33:
"at least one processors to perform the automatic determining" should read --at least one processor to perform the automatic determining--.

Column 40, Line 34, Claim 34:
"presentation to the users." should read --presentation to the user.--.

Column 40, Line 48, Claim 37:
"of content provides the user with access to the restricted" should read --of content provide the user with access to the restricted--.